(12) United States Patent
Brueckert et al.

(10) Patent No.: US 7,020,977 B2
(45) Date of Patent: Apr. 4, 2006

(54) METHOD OF CONFIRMING DIMENSIONS DURING RECONDITIONING OF AN ARTICULATED CONNECTOR

(75) Inventors: Richard A. Brueckert, Chicago, IL (US); William A. Guess, Omaha, NE (US)

(73) Assignee: TTX Company, Chicago, IL (US)

( * ) Notice: Subject to any disclaimer, the term of this patent is extended or adjusted under 35 U.S.C. 154(b) by 0 days.

(21) Appl. No.: 11/085,443

(22) Filed: Mar. 21, 2005

(65) Prior Publication Data

US 2005/0160583 A1  Jul. 28, 2005

Related U.S. Application Data

(62) Division of application No. 10/170,892, filed on Jun. 13, 2002, now Pat. No. 6,944,925.

(60) Provisional application No. 60/298,162, filed on Jun. 13, 2001.

(51) Int. Cl.
  *G01B 5/20* (2006.01)
  *B61K 9/02* (2006.01)

(52) U.S. Cl. .......................... 33/651; 33/501.5; 33/546; 33/549

(58) Field of Classification Search .............. 33/501.5, 33/501.45, 501.08, 501, 600, 651, 545, 546, 33/562, 530, 549, 551, 553, 541; D10/64

See application file for complete search history.

(56) References Cited

U.S. PATENT DOCUMENTS

| | | | |
|---|---|---|---|
| 450,947 A | 4/1891 | Barnes | 33/541 |
| 491,174 A | 2/1893 | Hazelhurst et al. | 33/541 |
| 892,563 A | 7/1908 | Starbird | 33/541 |
| 1,340,032 A | 5/1920 | Fleming | |
| 1,346,224 A | 7/1920 | McCormick | 33/203.11 |
| 1,638,885 A * | 8/1927 | Shea | 33/567 |
| 1,731,968 A * | 10/1929 | Bauman | 33/651 |
| 3,006,065 A | 10/1961 | Watson | |
| 3,548,481 A | 12/1970 | Bohn et al. | |
| 3,708,856 A | 1/1973 | Keifer | |
| 3,821,840 A | 7/1974 | Kershaw | |
| 4,055,254 A | 10/1977 | Chierici et al. | |
| 4,187,600 A | 2/1980 | Yeates et al. | |
| 4,249,664 A | 2/1981 | Murphy | |
| 4,330,076 A | 5/1982 | Lollis et al. | |
| 4,343,407 A | 8/1982 | Murphy | |
| 4,448,340 A | 5/1984 | Lollis et al. | |
| D282,264 S * | 1/1986 | Wiese | D19/37 |
| 4,593,445 A | 6/1986 | Snyder et al. | |
| 4,674,194 A * | 6/1987 | Riley | 33/551 |
| 4,959,523 A | 9/1990 | Fihey et al. | |
| D369,756 S * | 5/1996 | Noel | D10/64 |

* cited by examiner

*Primary Examiner*—R. Alexander Smith
(74) *Attorney, Agent, or Firm*—Brinks Hofer Gilson & Lione

(57) ABSTRACT

A method for confirming the dimensions of an articulated connector while it is still mounted to the end structure of a rail car is disclosed. The connector is measured by use of a gauge secured to a reference point on portions of the connector. Another portion of the gauge is aligned with a non-reference point to determine if the dimensions fall within industry standards.

3 Claims, 19 Drawing Sheets

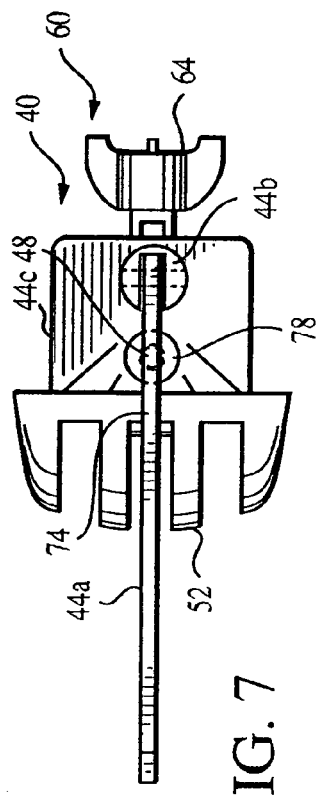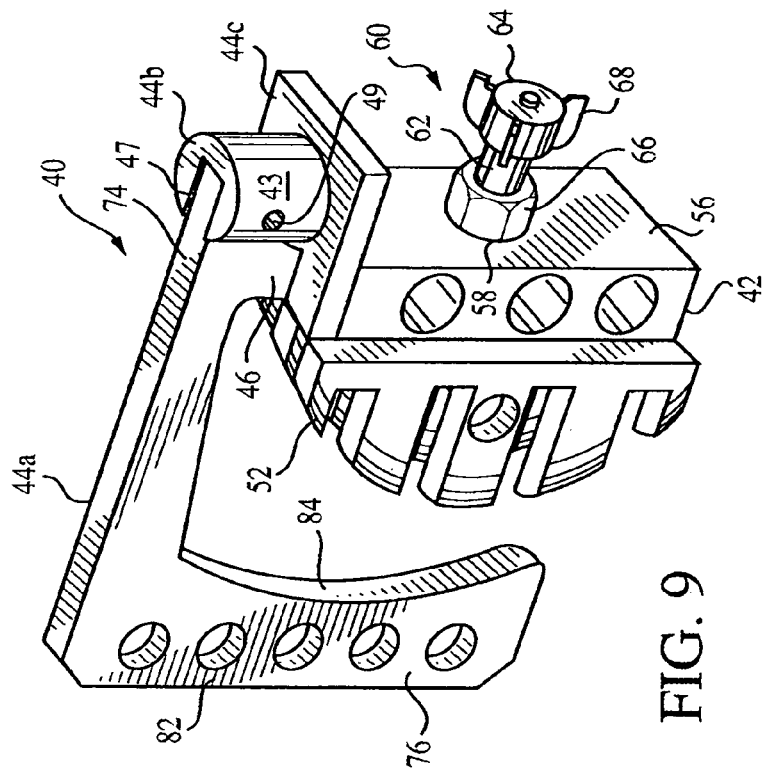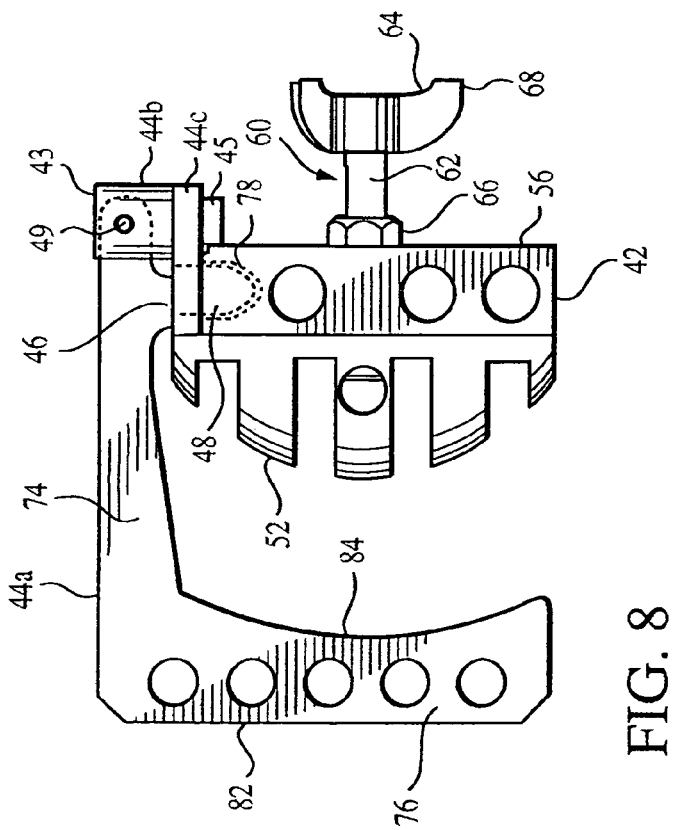
FIG. 7
FIG. 8
FIG. 9

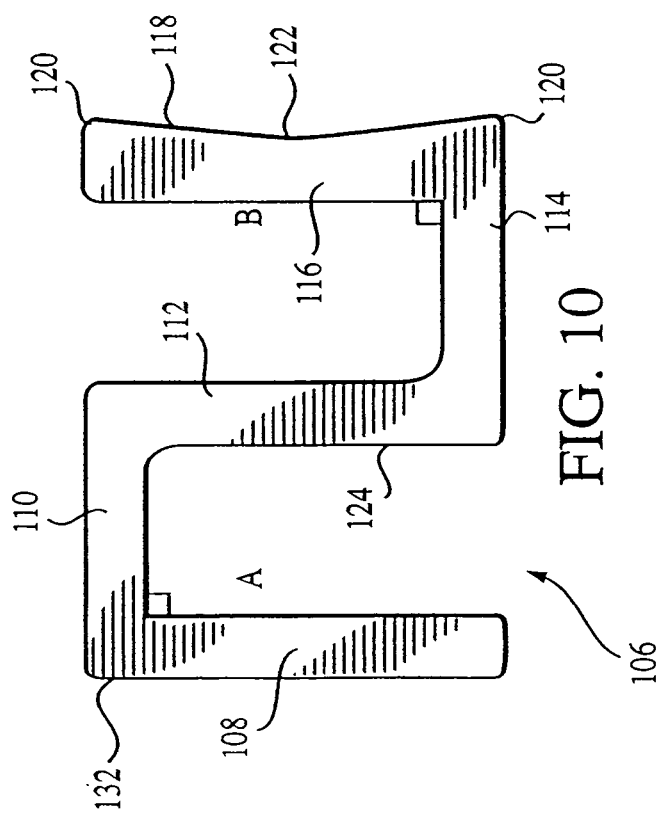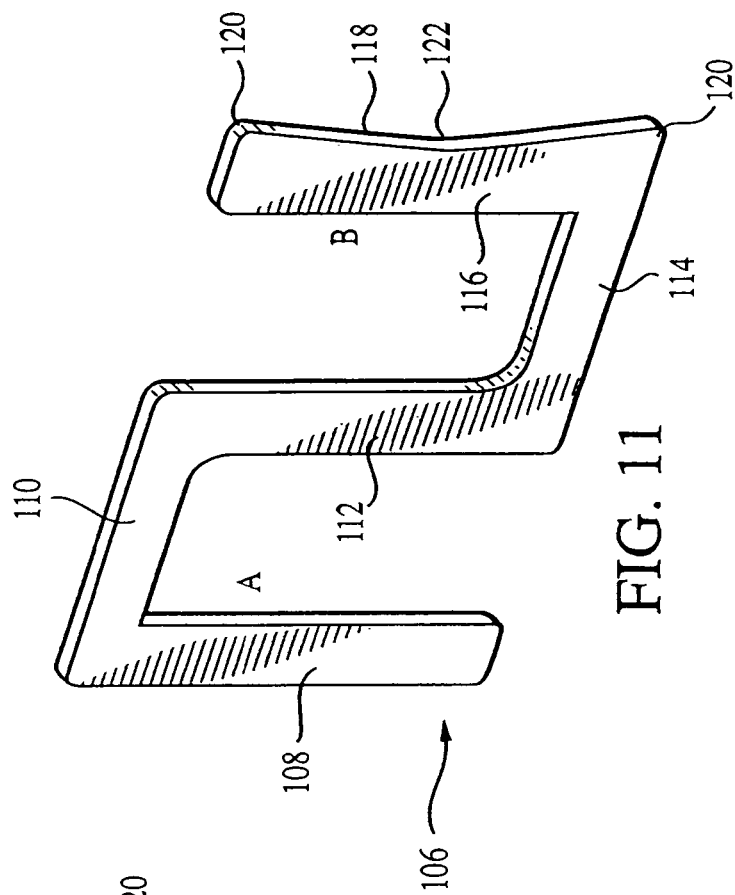

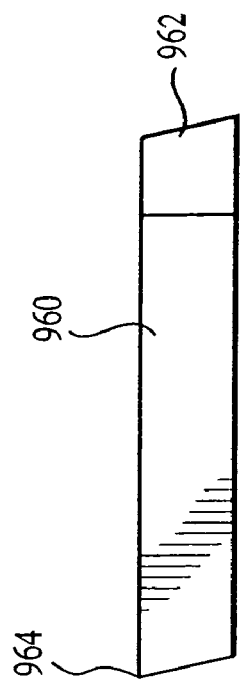
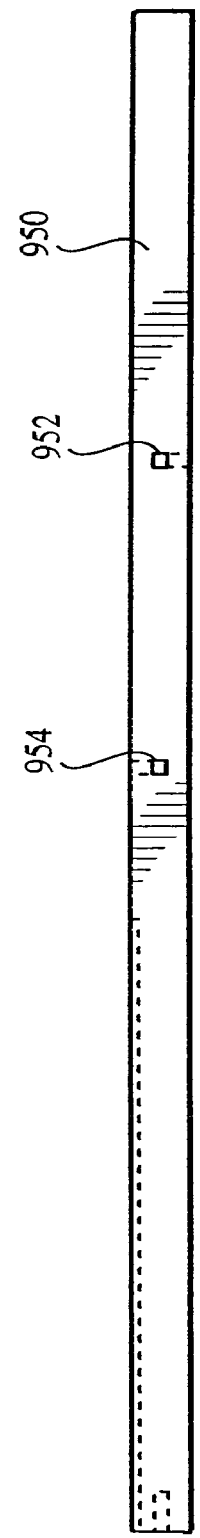
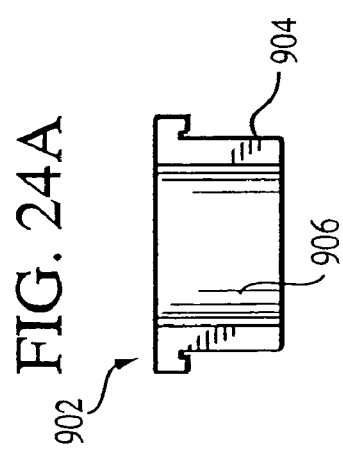
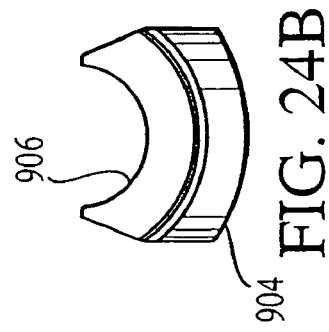
FIG. 26
FIG. 25
FIG. 24A
FIG. 24B

METHOD OF CONFIRMING DIMENSIONS DURING RECONDITIONING OF AN ARTICULATED CONNECTOR

RELATED APPLICATIONS

The present application is a division of and claims benefit under 35 U.S.C. §121 of Nonprovisional application Ser. No. 10/170,892, filed Jun. 13, 2002 now U.S. Pat. No. 6,944,925, both of which applications claim priority to U.S. Provisional Application No. 60/298,162, filed Jun. 13, 2001.

BACKGROUND OF THE INVENTION

Multi-unit railroad cars are typically interconnected using couplings, such as articulated connectors, to link one unit to the next. Most often, the connectors include a male casting portion mounted to the end structure of one of the rail car units which is joined to a female casting portion located on the end structure of the adjacent rail car unit. Joining of the male and female portions results in an articulated connection between the rail car units. The most frequently used connectors of this type in the U.S. industry include connectors manufactured by American Steel Foundries, Inc. (ASF) of Granite City, Ill. and Meridian Rail, Inc. (formerly and hereinafter National Castings) of Lombard, Ill.

The cargo portion of a railroad train comprises a plurality of multi-unit rail cars linked in this fashion. As such, the driving locomotive is only acting directly on the car adjacent to it, which is then joined to the next unit, etc. The pulling, or pushing, of the rail car units by the locomotive creates a significant level of stress on each connector as each bears the entire force of the rest of the rail cars. Any contact between the rigid areas of the male and female casting portions results in wear on those contact areas of the connectors.

The stress placed on the connectors results in wearing of the metal at several points of contact between the male and female portions of the connectors, or their respective components, due to impact and frictional contact. As articulated connector castings are an integral part of the car structure and are difficult and expensive components to replace, it is favorable to repair or recondition the connectors as opposed to replacing them or the entire rail car. Connector castings can commonly travel 1,200,000 miles or more without the need for significant maintenance. In the past, reconditioning of most rail car components has involved removing various parts from the rail car and reapplying them back into place after such reconditioning. Some couplers have been reconditioned in this way, especially those removable by design. Articulated connectors, however, are not suited for such removal and repair since they are integral to the car and such repair would be inefficient, time consuming, and expensive.

It is therefore an object of the present invention to provide a method of reconditioning rail car connectors such that the reconditioning occurs while the castings are still attached to the rail cars. It is a further object of this invention to simplify the measurement of portions of the connectors ensuring that the connectors are reconditioned to the appropriate dimensions, including the use of appropriate gauges. It is yet a further object of this invention to provide a method of reconditioning rail car connectors utilizing gauges to take the measurements of the connectors while still attached to the rail car. It is still another object of this invention to provide a method for reconditioning rail car connectors using a less labor-intensive process.

BRIEF SUMMARY OF THE INVENTION

In one aspect of the invention, a method is set forth for confirming the dimensions of an articulated connector while it is still mounted to the end structure of a rail car. The connector is measured to determine areas and amounts of wear on the casting portions of the connector by use of a gauge. The measurements are taken relative to a reference point on each of the castings. A portion of a gauge is placed in or on the connectors relative to a reference point. The gauges are preferably tailored to conform to the casting portion requiring measurement and to contact the reference point.

Another portion of the gauge can then be aligned with a non-reference point. The dimensions of the non-reference point relative to the gauge is reviewed to determine if the connection is within appropriate standards. In a preferred embodiment, the portion contacting the reference point and the portion aligned with the non-reference point are pivotably connected.

It is to be understood that both the preceding summary and the following detailed description are intended to be exemplary and explanatory and are intended to provide a further explanation of the invention claimed. The invention will be best understood by reference to the following detailed description read in conjunction with the accompanying drawings. It should be noted that there could be a wide range of changes made to the present invention without departing from its scope. Thus, it is intended that the foregoing be regarded as illustrative rather than limiting and that it be understood that it is the following claims, including all equivalents, which are intended to define the scope of the invention. Provisional Application No. 60/298,162 and Nonprovisional application Ser. No. 10/170,892 disclose related and complementary methods and apparatus and are hereby incorporated by reference.

BRIEF DESCRIPTION OF SEVERAL VIEWS OF THE DRAWINGS

FIG. 7 is a top view of a pivot gauge for ASF male castings;

FIG. 8 is a side view of a pivot gauge for ASF male castings;

FIG. 9 is a perspective view of a pivot gauge for ASF male castings;

FIG. 10 is a side view of an S-shaped gauge for National Castings male castings;

FIG. 11 is a perspective view of an S-shaped gauge for National Castings male castings;

FIG. 24a is a front view of a centering tool;

FIG. 24b is a bottom view of the centering tool of FIG. 24a;

FIG. 25 is a plan view of a boring bar used in the semi-automated process;

FIG. 26 is a cutting tool for use with the semi-automated process;

DETAILED DESCRIPTION OF THE INVENTION

Figure 1:
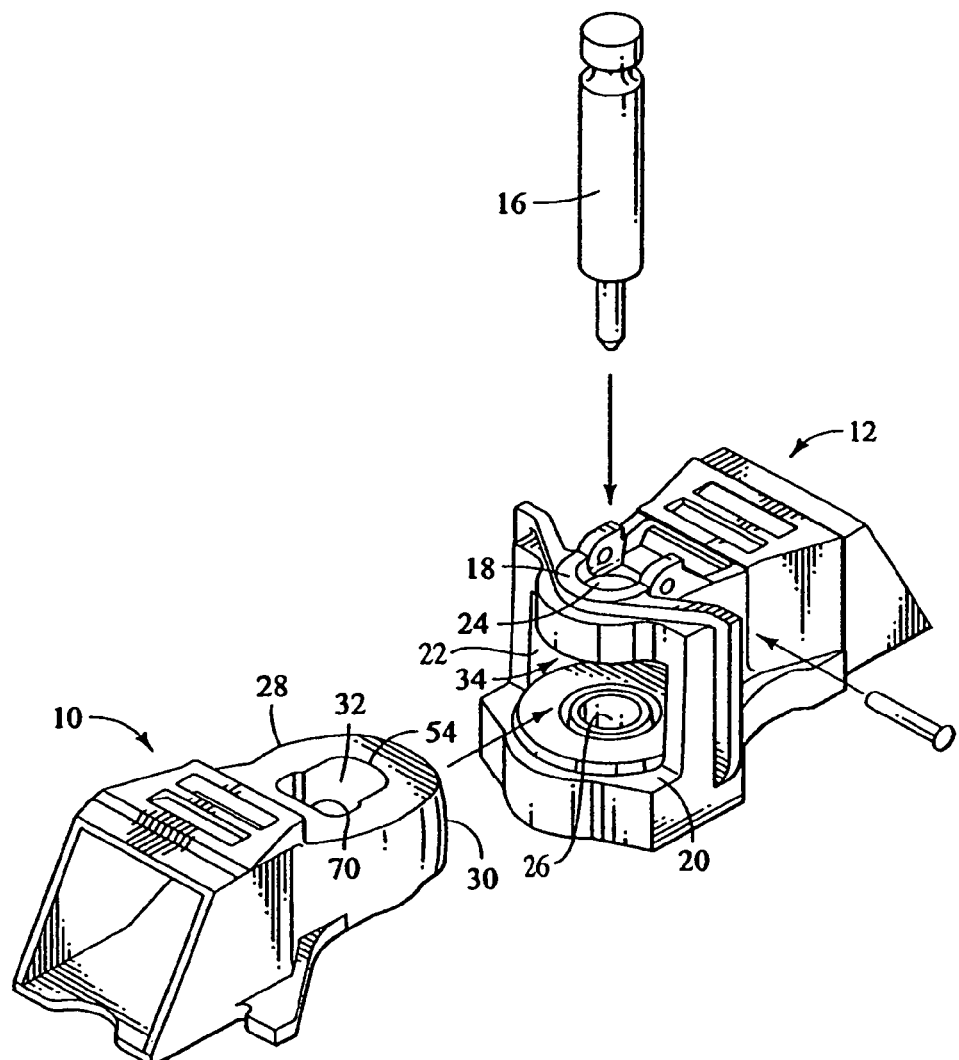
FIG. 1 is a perspective top view of male and female casting portions of an unassembled ASF type of connector.
Figure 2:
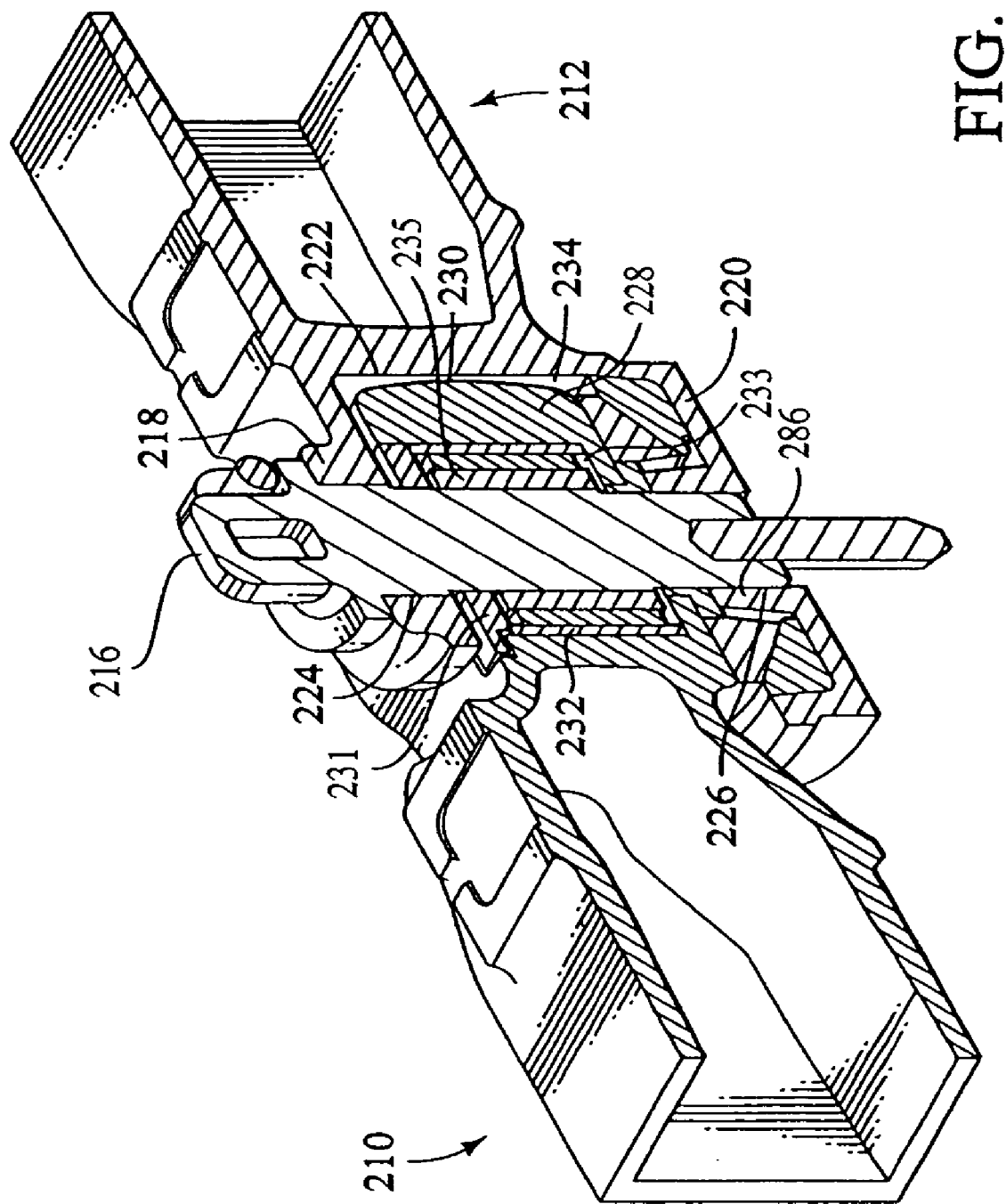
FIG. 2 is a perspective cross-section view of an assembled National Castings type of connector.
Figure 3:
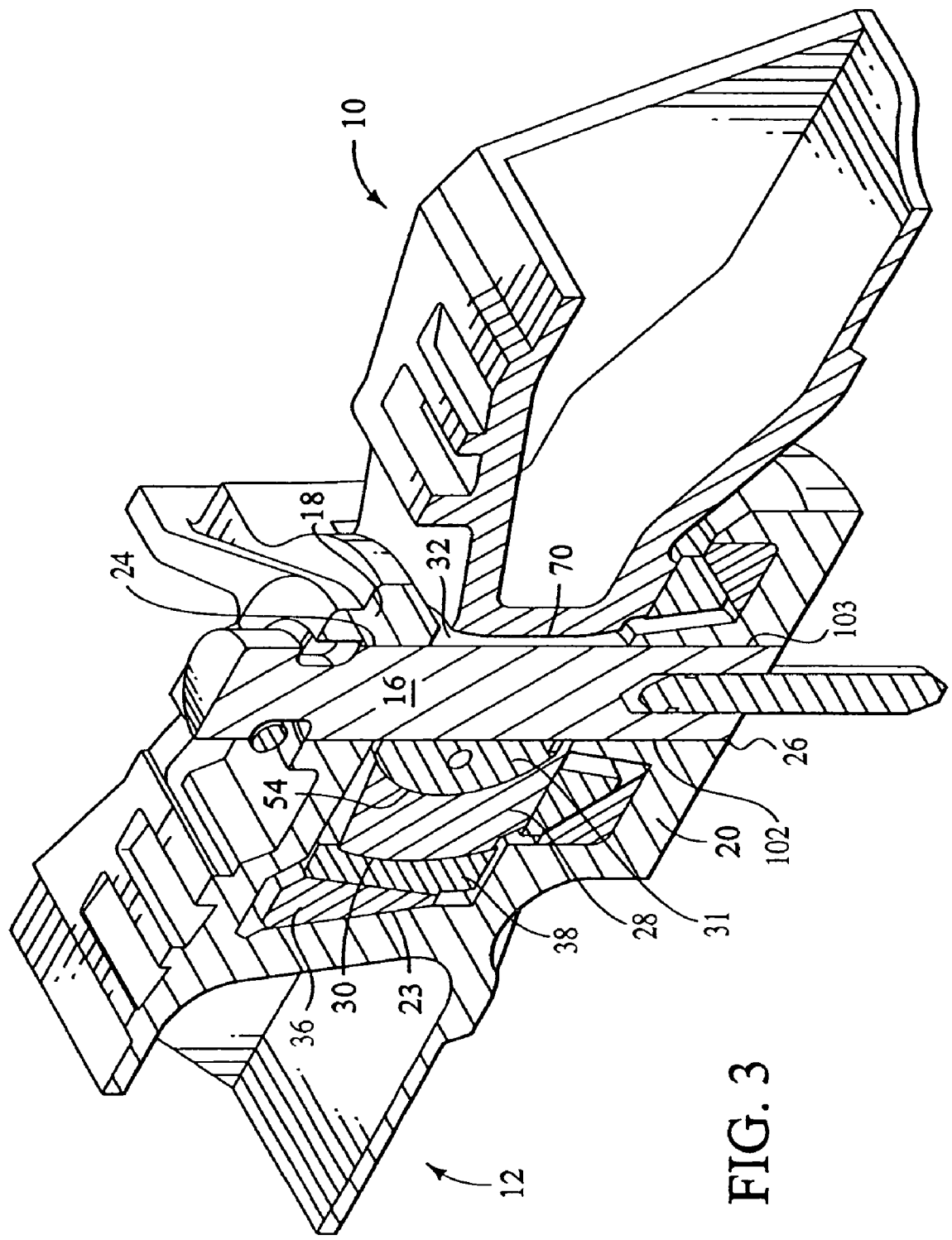
FIG. 3 is a perspective cross-section view of an assembled ASF connector.

Referring to FIGS. 1–3 generally, with like numbers representing like structures, the articulated connector castings being reconditioned are attached to the rail car end structure (not shown) and usually include a male casting 10, 210 located on one rail car unit and a female casting 12, 212 located on the following rail car unit such that the male and female castings can interlock joining the rail car units to form a multi-unit rail car. When the female and male castings are brought together, bores in both castings are aligned such that a pin 16, 216 can be inserted, securing the male and female castings and their internal components together and completing the connector. The connectors are articulated such that they can rotate about the pin and have vertical angularity, allowing the rail car units to pivot relative to each other during movement around curved tracks and undulating terrain.

As noted above, there are two dominant articulated connector types used in joining rail car units, namely ASF connectors and National Castings connectors, although other connector types exist which can be similarly accommodated by this invention. The following description of the ASF and National Castings connectors is exemplary of rail car connectors generally. As such, the following description of the invention is tailored to industry standards, but the invention could be modified to accommodate specific connectors used.

ASF Connectors

The ASF connector, as shown in FIGS. 1 and 3, comprises a male casting 10 and a female casting 12. The female casting 12 is generally U-shaped in cross section to receive the male casting 10. The female casting 12 includes a top portion 18 and a bottom portion 20, which are generally planar and are joined by sidewalls 22 and a generally concave backwall 23. The sidewalls 22, backwall 23, top portion 18 and bottom portion 20 define the generally U-shaped receiving cavity 34 of the female casting. Both the top portion 18 and the bottom portion 20 of the female casting include a cylindrical bore 24 and 26, respectively, which are aligned with one another.

The female casting additionally includes a wedge system located along the concave backwall 23. The wedge system includes a wedge 36 and a follower block 38. The follower block 38 is designed to conform to the spherical contour of the portion of the male casting with which it contacts. The wedge is then placed between the backwall 23 and the follower block 38, holding the follower block 38 in place and providing pressure. The wedge is held in place by gravity and drops as wear occurs within the system to maintain a low longitudinal slack condition, thereby keeping the follower block 38 in constant contact and compression with the male casting 10.

The male casting 10 includes a forward end 28, which is a generally U-shaped projection of generally constant thickness. The male casting 10 has a bore 32 with generally square features at the side nearest the attaching car unit, or posterior surface 70 of the bore 32, and with a U-shaped concave surface nearest the opposite, anterior surface 54 of the bore. The male bore 32 is different in shape than the female bores 24 and 26 as the anterior surface 54 of the male bore 32 is concave and generally spherical in shape and the bore has an overall greater volume than that required for insertion of the pin. As such, a pin bearing block 31 is inserted into the bore 32 and mates with the anterior surface 54 of the bore, as shown in FIG. 3. The shape of the pin bearing block 31 is generally spherical along the end contacting the anterior surface 54 of the bore 32, to compliment the bore, and has a generally vertical concave cylindrical shape along the opposite side to receive the pin 16. When the pin bearing block 31 is placed in the bore 32, the concave cylindrical side of the pin bearing block 31 and the posterior end 70 of the bore 32 define the area to receive the pin as described below.

The forward end 28 of the male casting is generally U-shaped to compliment the interior of the female casting in shape. The forward end 28 includes a contact surface 30 at the far end of the male casting which includes the generally U-shaped area. The contact surface 30 is the portion of the male casting in contact with the follower block 38 when the male casting 10 is inserted into the female casting 12.

Upon assembly, as shown in FIG. 3, the male casting 10, specifically the forward end 28 is inserted into the cavity 34 of the female casting 12. The contact surface 30 of the male casting is positioned against the mirroring interior surface of the follower block 38 of the female casting such that the bore 32 in the male casting is aligned with the bores 24 and 26 of the female casting. When all three bores 24, 26 and 32 are aligned, a cylindrical pin 16 can be inserted through them. The pin 16 is inserted into the bore 24 in the top portion 18 of the female casting and then passes through the bore 32 in the male casting 10, which includes the pin bearing block 31, and then passes further to engage the bore 26 in the bottom portion 20 of the female casting 12. The top of the pin is preferably secured to the top of the female casting.

The wedge system works to eliminate slack from the connector system by applying pressure on the male casting and hence on the bores and pin. Due to the wedge system and the general construction of the castings, significant wear occurs in selective areas. On the female casting, significant wear occurs on the anterior surfaces 103 of the female bores 24 and 26 as the compressive forces from pulling cars pushes the pin 16 against those surfaces. Conversely, the posterior surfaces 102 of the female bores receive negligible wear, as a result of the wedge system not allowing pin stress on this surface. On the male casting, some wear occurs along the spherical anterior surface 54 of the bore 32 as the pin bearing block 31 rides against it. Conversely, the posterior surface 70 of the male bore 32 receives negligible wear under normal operating conditions. While wear occurs on the follower block 38, wedge 36, and pin bearing block 31, these components are generally replaceable and not subject to reconditioning. The male casting also experiences significant wear on the contact surface 30 as a result of contact with the follower block 38 and compressive forces from other rail car units.

National Castings Connectors

The National Castings connector, as shown in FIG. 2 with like numbers referring to like structures, again comprises a male casting 210 and a female casting 212. The female casting 212 is generally round in cross section to receive the generally round male casting 210. The female casting 212 includes a top portion 218 and a bottom portion 220, which are generally planar and joined by a generally rounded continuous sidewall 222. The top portion 218, bottom portion 220, and the continuous sidewall 222 define the receiving cavity 234 of the female casting. Both the top portion 218 and the bottom portion 220 of the female casting include a cylindrical bore 224 and 226, respectively, which are aligned with one another.

The male casting 210 includes a forward end 228, which is a generally round projection of generally constant thickness. The male casting 210 has a bore 232 generally cylindrical in shape. A bushing is inserted into the bore 232 of the male casting to contact and protect the inner surface of the bore from significant wear. The bushing system preferably includes a retaining collar 231 and counterbore feature 233 which hold the bushing in place in the male bore 232. The bushing is also generally cylindrical having a sleeve 235 which is capable of receiving the pin during connection. Further, the bushing is made up of varying layers of hardened steel and rubber capable of absorbing shock and wear.

The forward end 228 of the male casting is generally round to compliment the interior of the female casting in shape. The forward end 228 includes a contact surface 230 at the far end of the male casting which includes the generally rounded area. The contact surface 230 is the portion of the male casting that can come in contact with the continuous sidewall 222 of the female casting.

Upon assembly, the male casting 210, specifically the forward end 228 is inserted into the receiving cavity 234 of the female casting 212. The male casting is positioned in the receiving cavity 234 of the female casting such that the male bore 232 and the sleeve 235 of the bushing system in the male casting are aligned with the bores 224 and 226 of the female casting. When all three bores 224, 226, 232 and the sleeve 235 of the bushing system are aligned a cylindrical pin 216 can be inserted through them. The pin 216 is inserted into the bore 224 in the top portion 218 of the female casting and then passes through the bore 232 and hence sleeve 235 of the bushing system in the male casting 210 and then passes further to engage the bore 226 in the bottom portion 220 of the female casting 212. The top of the pin is preferably secured to the top of the female casting.

Compression and stress on the rubber in the bushing results in greater movement of the male casting as a whole and can allow the contact surface 230 of the male casting 210 to contact the continuous sidewall 222 of the female casting. On the female casting, significant wear occurs on the anterior surface 286 of the female bore 226 on the bottom portion 220 of the female casting. Some wear also occurs on the anterior surface of the female bore 224 of the top portion 218 of the female casting, but it is not usually significant since the bore 224 of the top portion 218 is generally larger in diameter. Negligible wear occurs on the posterior sides of either bores 224 and 226 of the top portion and bottom portion of the female casting. Additionally, some wear can occur on the continuous sidewall 222 of the receiving cavity 234 of the female casting, although reconditioning of this wear is generally unnecessary. On the male casting, wear occurs along the contact edge 230 of the male casting 210, as it comes into frictional and impact contact with the rear portion of the sidewall 222 of the female casting 212. As fatigue occurs on the bushing from contact with the pin, the bushing is replaced.

During use of the rail car units so connected, wear can occur as specified above due to friction caused by the pivoting and movement of the rail car units relative to one another. The following is a method for reconditioning and repairing rail cars at these common sites of wear while the connectors are still attached to the rail car. The reconditioning returns the worn parts of the connectors back to their proper dimensions to ensure peak performance upon re-connection of the rail car units.

Reconditioning of the ASF Articulated Connector

The commonly worn areas of both the female and male castings should be prepared so that an accurate measurement can be taken to determine if reconditioning is required. Such preparation includes cleaning the surfaces of rust, dirt, grit, grease, lubrication residue, or the like. Substances such as grease, grime and lubricants can be scraped from the surfaces. Remaining contaminants can be burned off with a torch or ground away. Metal upsets on the surfaces to be reconditioned should be carefully machined smooth to prevent cold laps during later welding. The female and male castings of the connectors are then measured to determine if reconditioning is required.

Male Casting

Figure 20:
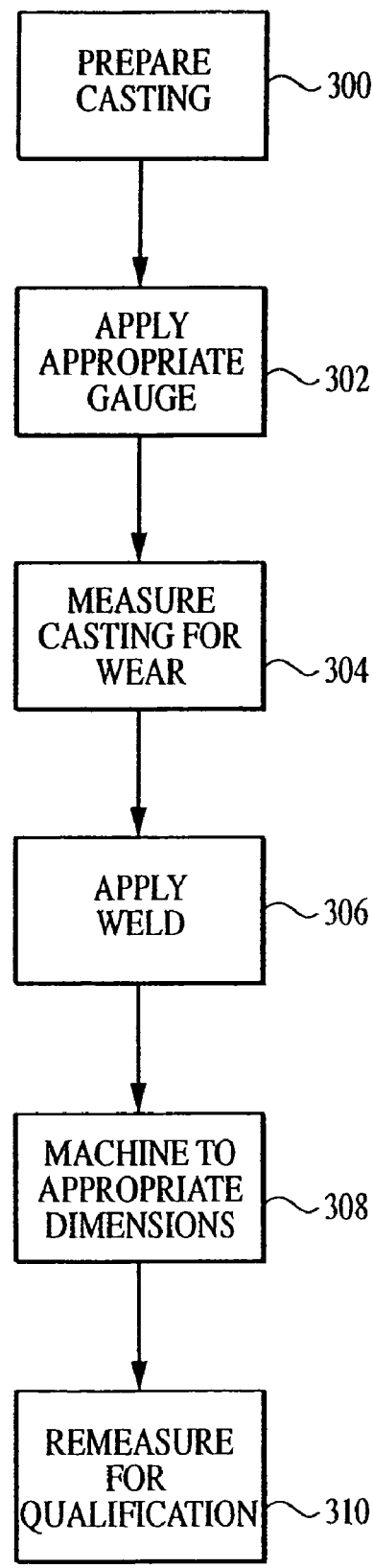
FIG. 20 is a flow chart of the process for reconditioning a connector casting.

The most commonly worn area of the male casting 10 is the contact surface 30 of the male bore 32 as it is in frictional contact with the follower block 38. FIG. 20 generally shows the steps of the reconditioning process applicable to both the male casting, and as will be seen later, the female casting. Once the area to be measured has been prepared and cleaned 300, the appropriate gauge is applied 302 to the male casting and the contact surface 30 of the male connector 10 is measured 304 by use of a gauge 40 designed specifically for the male casting 10. In accordance with the present invention, the gauge 40 generally mimics the shape of the contact surface 30 of the male casting 10, the bore 32 and the pin bearing block 31 to allow a user to determine whether the width of metal between the anterior surface 54 of the male bore 32 and the contact surface 30 varies from its original values. The measurement of the ASF male connector is best accomplished using a pivot gauge 40, shown in FIGS. 7–9 and 16–17, and discussed below in further detail.

Once it is determined that the male casting 10 of the connector requires reconditioning 304, the contact surface 30 and the surrounding areas are preheated to between 300–500° F., for example by use of a torch with a heating tip, i.e. a rosebud welding nozzle. It is preferable to use a non-contact thermometer to identify that the preheat temperature is within the desired range. The affected area is then built up with weld 306, preferably a Stoody 105-G ($CO_2$ and All-Position (AP) modified) wire having the following chemical composition by percent weight: 0.20% C, 1.0% Mn; 0.4% Si; 3.2% Cr; 0.5% Mo; <0.50% Others; and balance % Fe. Another preferred wire is a Stoody 105-G (All-Position (AP) modified) wire or an equivalent wire.

The area is then machined 308 to within 1/16" of the contour edge 84 of the pivot gauge 40, shown in FIGS. 7–9 and 16–17. Machining is generally the removal of weld, metal, or other material and can include grinding, drilling, milling, turning, boring, and broaching, among others. The weld is additionally blended into existing adjacent surfaces. Listed below are suggested machine settings for the welding operator. The preferred welding pattern for the weld application is concentric parallel arcs. The measuring gauge 40 should remain in place while the weld build up and machining steps occur, however the swing arm 44a should be pivoted or moved out of the way to prevent any interference or contact with the heated weld. As a precaution, the surfaces of the gauge 40 subject to weld spatter should be lightly coated with a spatter resistant product prior to welding. The swing arm 44a should be pivoted out of the way of the weld area to avoid being covered with spatter, but can remain in place on the male casting during welding.

| Wire | Required Gas | Welding Position | Volts | Amps | Feed Rate (ipm) |
|---|---|---|---|---|---|
| Stoody 105G ($CO_2$ & AP) | $CO_2$ or 75% Ar/25% $CO_2$ | Horizontal | 27 | 210 | 330–370 |
| Stoody 105G ($CO_2$ & AP) | $CO_2$ or 75% Ar/25% $CO_2$ | Flat (Downhand) | 28 | 220 | 385–425 |
| Stoody 105G ($CO_2$ & AP) | $CO_2$ or 75% Ar/25% $CO_2$ | Overhead | 27 | 160 | 245–285 |
| Stoody 105G (AP modified) | 75% Ar/25% $CO_2$ | Horizontal | 26 | 230 | 275–315 |
| Stoody 105G (AP modified) | 75% Ar/25% $CO_2$ | Flat (Downhand) | 28 | 230 | 385–425 |
| Stoody 105G (AP modified) | 75% Ar/25% $CO_2$ | Overhead | 26 | 175 | 265–315 |

Preferably, the application of weld to the worn surfaces should be performed in a relatively still air environment to prevent loss of shielding gas and fast cooling. The casting temperature should not be allowed to drop below 250° F. at any time during the build up process. It may, therefore, be necessary for the casting to be reheated during the process. If the welding process is interrupted for any length of time, the welded area must be thoroughly covered with an insulating blanket to prevent cracking. Welding practices known in the art regarding the removal of all slag, oxide scale and spatter between passes should be followed. Weld should be finished as to not produce a notch effect at the junction of the weld with the parent metal and every precaution should be taken to avoid abrupt changes in section thickness at the line of fusion. Cracks, incomplete fusion, overlaps, undercut, unfilled craters, voids, and other defects can be highly problematic and should be avoided. For porosity, no rounded indications greater than 3/16" long, and no 6" square regions containing ten or more rounded indications are preferred.

Once welding 306 and machining 308 are accomplished, the gauge 40 is again used to re-qualify the part 310 and ensure proper repair has occurred, by checking that the dimensions are correct and no wear or over buildup remains. Preferably, the area is then thoroughly covered with an insulating blanket to allow slow cooling. Both preheating and slow cooling during the process are important to prevent cracking. After cooling, the restored area is tested using dye penetrant or magnetic particle inspection to ensure the quality of the restored surface is free of defects.

The preferred gauge 40, as shown in FIGS. 7–9 and 16–17, for use in measuring the ASF male connector is a pivot gauge, which preferably includes two members: a base 42 and a swing arm assembly 44. The base 42 is generally a block-shaped member having a plurality of sides as shown. The top of the base 42 includes an opening 78 to receive a portion of the swing arm assembly 44. The front side of the base 42 has a relatively spherical surface 52 to engage the anterior surface 54 of the bore 32 in the male casting 10, which has a complimentary shape. The complimentary shapes allow the proper vertical relationship of the gauge to the male casting to ensure accurate measurement of the worn portion. The rear side 56 of the base preferably includes an opening 58 to receive a screw jack assembly 60. The screw jack assembly 60 includes a threaded rod 62 having a brace end 64 and a nut 66, forming an expanding clamp brace. The brace end 64 is configured to brace or secure the base 42 against the interior of the male bore 32. Preferably, the brace end 64 has three legs 68 contacting the posterior surface 70 of the male bore 32. The nut 66, when turned, extends or retracts the brace end 64 from the base 42. As a result, the turning of the nut 66 can extend the brace until it is flush with the posterior surface 70 of the male bore 32 securing the base 42 of the pivot gauge in the male bore 32. The anterior surface 54 and posterior surface 70 are typically unworn or minimally worn portions of the bore 32 that are sufficient for reference measurement for refinishing.

The swing arm assembly 44 comprises a swing arm 44a, a cylindrical holder 44b, and a plate 44c. The swing arm 44a is generally L-shaped, and includes an extension arm portion 74 and a measurement arm portion 76. The length of the extension arm 74 is determined by the dimensions of the male casting generally, including the contact surface 30 and the male bore 32.

The swing arm assembly 44 is pivotally connected to the base. Plate 44c is secured to the base 42 by a countersink bolt 48 located on the plate 44c. The countersink bolt 48 is received in opening 78 in the base 42. The cylindrical holder 44b, which preferably has a top portion 43 and a bottom portion 45, is then pivotally attached to the plate 44c. The bottom portion 45 of the cylindrical holder 41 is preferably inserted into a hole (not shown) in plate 44c and is secured to the plate, preferably with a c-shaped clip (not shown) inserted into and around a smaller diameter of a groove in the bottom portion 43 of the cylindrical holder 41.

The top portion 43 of the cylindrical holder 41 includes a notch 47 to receive the extension arm 74 of the swing arm 44a. Additionally, an inline hole 49 extends horizontally through the cylindrical holder 41 which aligns with a similar hole (not shown) in the extension arm. A pin can then be inserted through the hole 49 and the hole in the extension arm 74, securing the extension arm 74 to the cylindrical holder 41.

Figure 16:
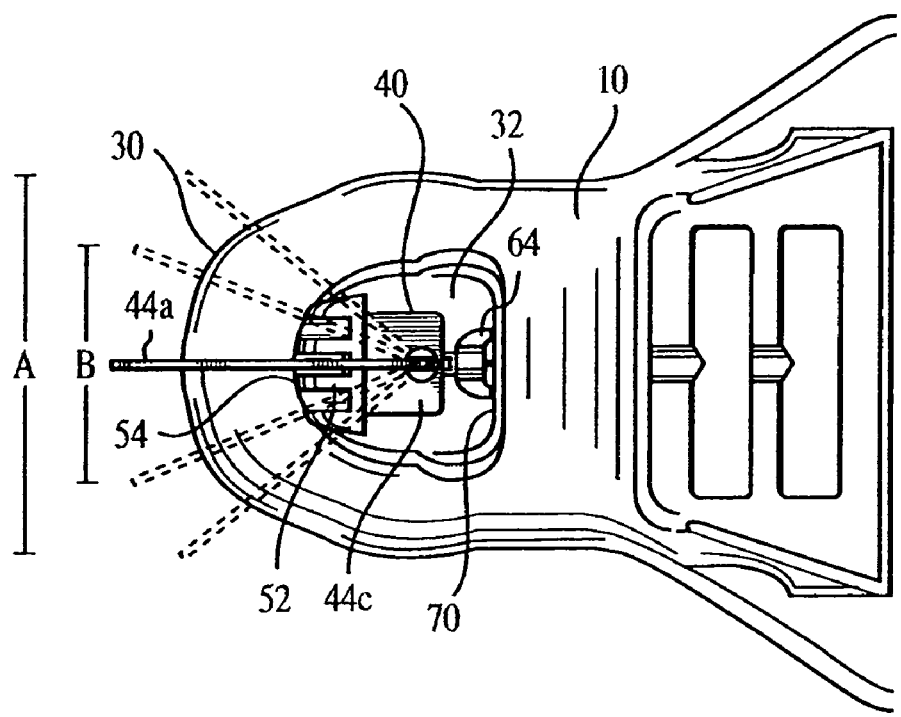
FIG. 16 is a top view of a pivot gauge applied to an ASF male casting.

The swing arm assembly results in the plate 44c being secured to the base 42 via countersink bolt 48, the cylindrical holder 44b being removably and pivotally secured to the plate 44c, and the swing arm 44a being removably and pivotally secured to the cylindrical holder 44b. The swing arm 44a is thus capable of pivoting generally vertically up from the base around the inline hole 49 and pin. This allows the swing arm 44a to be pivoted up and away from the male casting 10, when desired. The cylindrical holder 44b and hence the swing arm 44a are additionally able to pivot horizontally around the axis of the cylindrical holder 44b, allowing the swing arm 44a and its contour edge 84 to sweep along a desired range of the male casting contact surface 30, as shown in FIG. 16.

The swing arm 44a additionally includes a flat portion 46, which is part of the extension arm 74 that contacts the plate 44c and ensures the proper relationship between the contour edge 84 and the spherical surface 52 of the base 42. The measurement arm 76 then extends downwardly from the extension arm 74.

The measurement arm 76 includes a front edge 82 and a contoured edge 84. The curve of the contour edge 84 is designed to conform in shape with the contact surface 30 of the male casting 10 of the connector. The contoured edge 84 can swing the entire range of the contact surface 30 of the male casting 10. The length of the extension arm 74 is such that the contour edge 84 of the swing arm 44a is less than approximately ⅛" from the contact surface 30 of a male casting 10 having no wear. The distance between the contour edge 84 and the contact surface 30 of the non-worn male casting 10 may be different based on the type of connector being used, but should allow the user to determine whether an appropriate amount of wear has occurred requiring reconditioning. Such a determination is described below.

Figure 17:
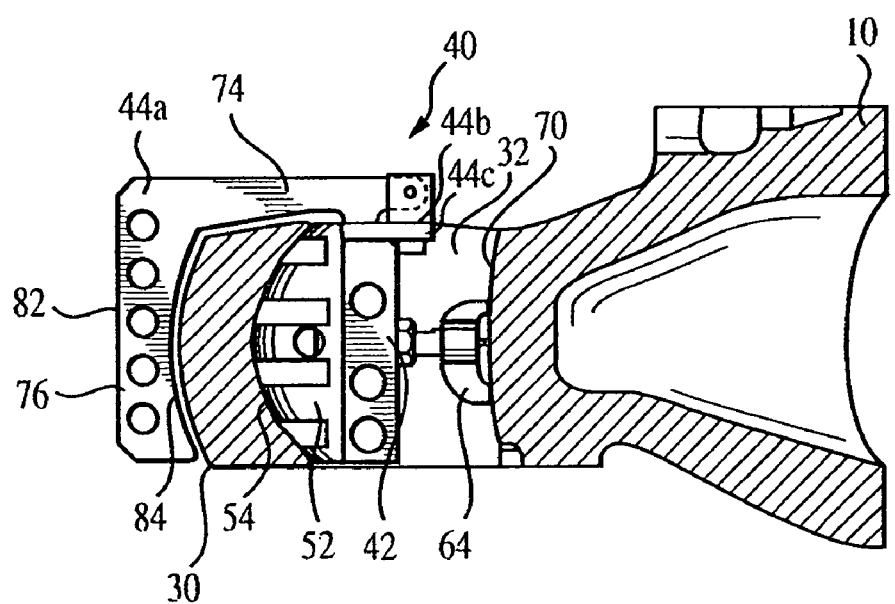
FIG. 17 is a cross sectional view of a pivot gauge applied to a male ASF casting.

Once the surface to be reconditioned has been cleaned and prepared, the pivot gauge 40 is used to determine if reconditioning is necessary. First, the base 42 is inserted into the bore 32 of the male casting 10 such that the spherical surface 52 is in contact with the anterior surface 54 of the bore 32. The nut 66 of the screw jack assembly 60 is then turned until the brace end 64 is sufficiently extended against the posterior surface 70 of the male bore 32. If, for example, a three legged brace as shown in FIGS. 16–17 is used, the nut 66 should be turned by hand until all three legs 68 are flush against the posterior surface 70. The nut 66 should be snug, preferably turned no more than ⅛ of a turn past finger tight. The swing arm assembly 44 is then secured to the base 42 by inserting the countersink bolt 48 of the plate 44c into the opening 78 in the base 42, pivotally attaching the cylindrical holder 44b to the plate 44c, and pivotally attaching swing arm 44a to the cylindrical holder 44b. The swing arm 44a can now be rotated over the contact surface 30 of the male casting 10. The anterior surface 54 of the bore 32 in the male casting 10 acts as a reference point to determine the sum of material thickness lost due to wear between the anterior surface 54 and the contact surface 30 of the male casting 10. The anterior surface 54 is suitable to be used as a reference surface as it should not have significant wear itself and will generally maintain its original dimension and contour. It should be noted that restoration of the contact surface 30 will also account for the minimal wear on the anterior surface 54.

The pivot gauge 40 serves two purposes. The first use of the pivot gauge is to move the swing arm 44a through a maximum range, marked as A in FIG. 16, covering a portion of the contact surface 30 to ensure that no interference exists. If any interference is found through the maximum range in that the dimensions of the contact surface 30 are greater than specified, those areas must be machined to conform to the gauge contour. Then the pivot gauge 40 is moved through a minimum range, marked as B in FIG. 16, having a smaller arc and covering a smaller area of the contact surface 30. The area included in the minimum range is subject to the greatest amount of wear during use and is hence a critical area for measurement. To determine if reconditioning is necessary, the swing arm 44a is moved through the minimum range B. If at any time a ¼" or greater diameter cylindrical pin can be inserted between the contour edge 84 of the swing arm 44a and the contact surface 30 of the male casting 10 of the connector within the minimum range, reconditioning of the male casting 10 is required. If a ¼" or greater diameter pin cannot be inserted between the contour edge 84 of the swing arm 44a and the contact surface 30 of the male casting 10 of the connector within the minimum range, reconditioning of the male casting 10 is not required. After reconditioning of the worn areas is completed, as described above, the swing arm 44a is rotated through the maximum limits again to ensure proper repair has occurred and no excess weld remains.

Female Casting

Figure 12:
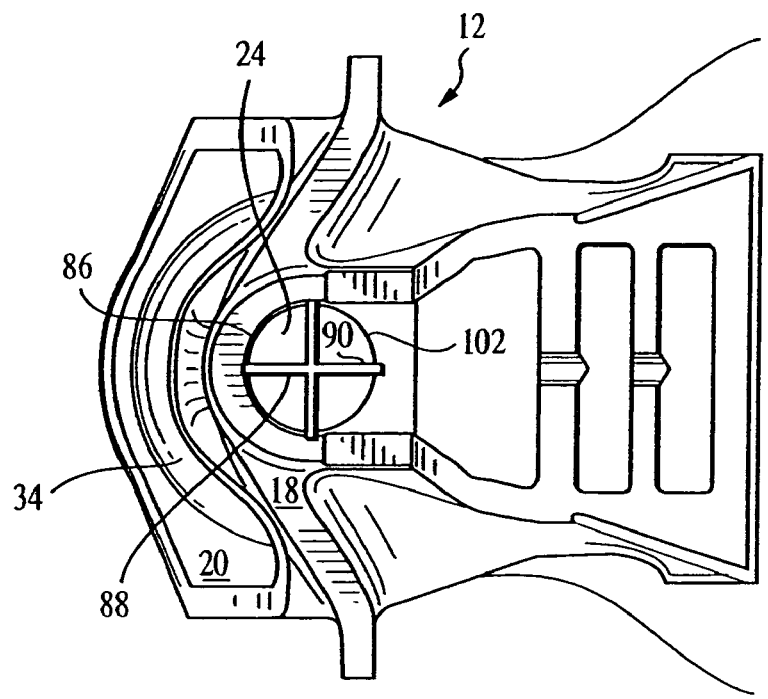
FIG. 12 is a top view of a drop-in gauge inserted into the top bore of a an ASF female casting.
Figure 13:
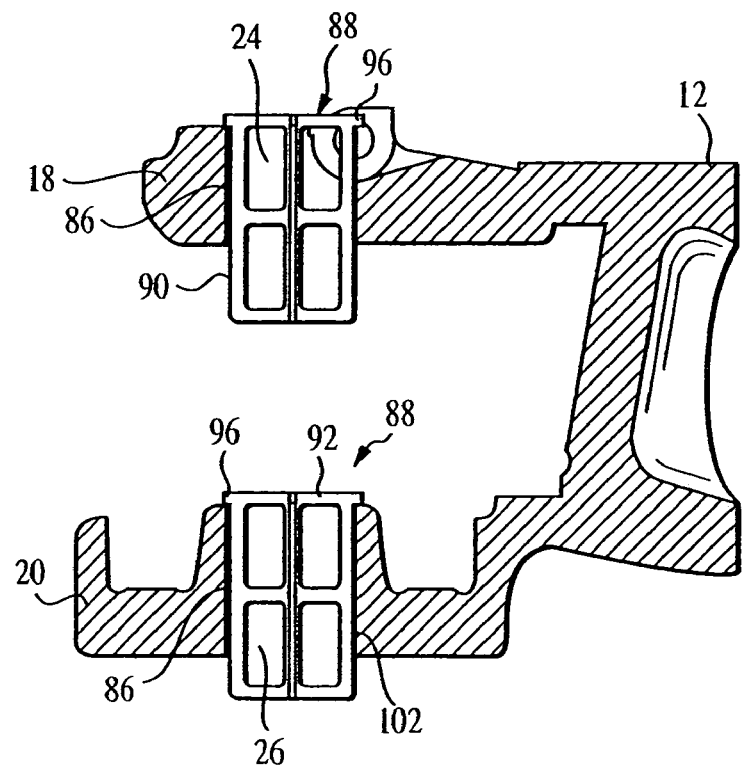
FIG. 13 is a cross sectional view of a drop-in gauge inserted into the bores of an ASF female casting.
Figure 14:
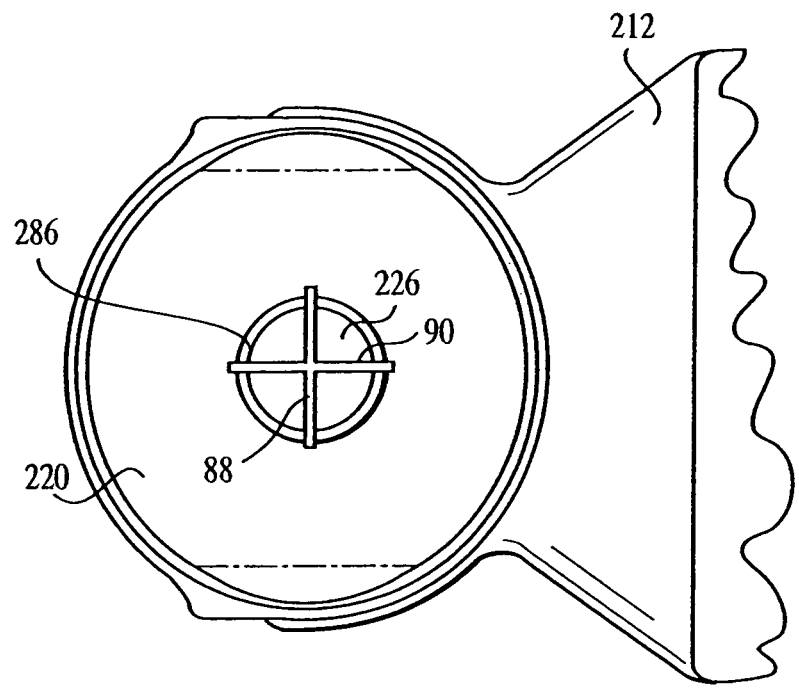
FIG. 14 is a bottom view of a drop-in gauge inserted into the bottom bore of a National Castings female casting.
Figure 15:
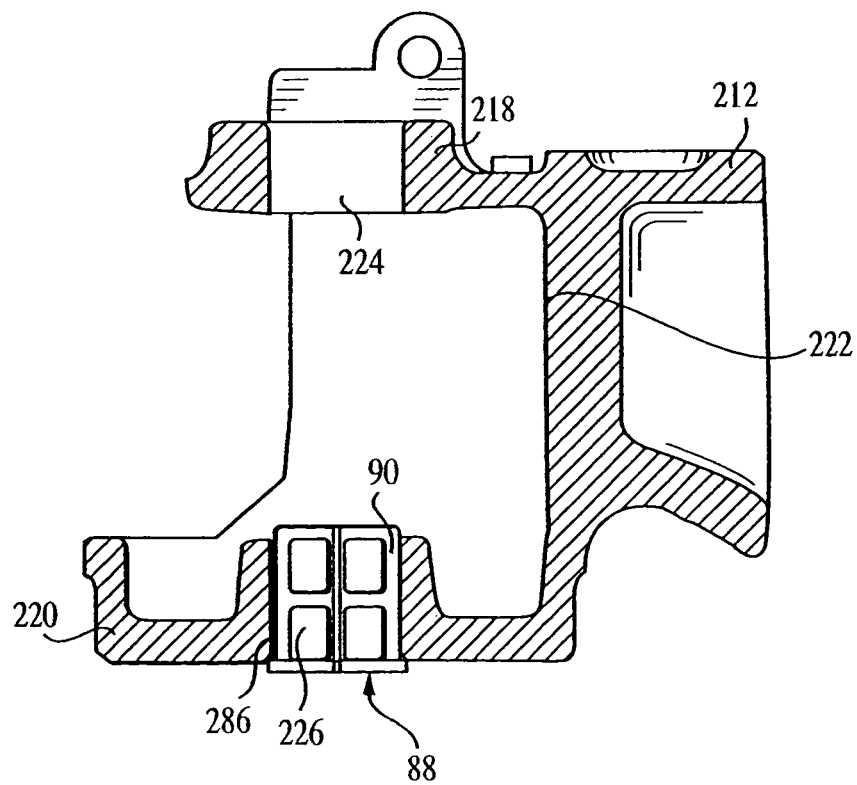
FIG. 15 is a cross sectional view of a drop-in gauge inserted into the bottom bore of a National Castings female casting.

The most commonly worn areas of the female casting 12, as shown in FIGS. 12–13, are the anterior surfaces 86 of the bores 24 and 26, since these are in frictional contact with the pin 16 holding the castings together. The measurement of the female casting 12 is accomplished by use of a gauge 88 designed specifically for the bores 24 and 26 of the female casting 12. The gauge 88 generally mimics the shape of the bores 24 and 26 of the female casting 12 to determine if the bores vary from their original dimensions. The measurement of the ASF female casting 12 is best accomplished using a drop-in gauge, shown in FIGS. 4–6 and 12–15, and discussed below in further detail.

If restoration of either of the bores 24 or 26 of the female casting 12 is required, the anterior surface 86 of the bores so affected and the surrounding area is preheated to between 300–500° F., for example by use of a torch heating tip, i.e. a rosebud welding nozzle. The affected area is then built up with weld, preferably Stoody Build-Up APG ($CO_2$ modified) wire having the following chemical composition by percent weight: 0.12% C, 1.0% Mn; 0.4% Si; 1.4% Cr; 0.5% Mo; <0.50% Others; and balance % Fe. Another preferred wire is Stoody Build-Up APG wire or equivalent wire. The built-up area is then machined to within 1/16" of the appropriate gauge. The weld is additionally blended into existing adjacent surfaces. The following are suggested machine settings for the welding operator. The preferred welding pattern for the weld application is concentric parallel arcs.

| Wire | Required Gas | Welding Position | Volts | Amps | Feed Rate (ipm) |
| --- | --- | --- | --- | --- | --- |
| Stoody Build-up APG ($CO_2$ modified) | $CO_2$ or 75% Ar/25% $CO_2$ | Horizontal | 25 | 200–225 | 300–375 |
| Stoody Build-up APG ($CO_2$ modified) | $CO_2$ or 75% Ar/25% $CO_2$ | Flat (Downhand) | 26 | 200–225 | 340–400 |

-continued

| Wire | Required Gas | Welding Position | Volts | Amps | Feed Rate (ipm) |
|---|---|---|---|---|---|
| Stoody Build-up APG ($CO_2$ modified) | $CO_2$ or 75% Ar/25% $CO_2$ | Overhead | 25 | 160–180 | 245–280 |
| Stoody Build-up APG | 75% Ar/25% $CO_2$ | Horizontal | 25 | 200–225 | 300–375 |
| Stoody Build-up APG | 75% Ar/25% $CO_2$ | Flat (Downhand) | 26 | 200–225 | 340–400 |
| Stoody Build-up APG | 75% Ar/25% $CO_2$ | Overhead | 25 | 160–180 | 245–280 |

The same precautions and protocol should be followed regarding weld build up and machining as with the process on the male casting 10, described above. The female casting 12 is then again measured with the appropriate gauge 88 to ensure that the proper dimensions have been restored. The area is then thoroughly covered with an insulating blanket to allow slow cooling. Both preheating and slow cooling during the process are important to preventing cracking. After cooling, the restored area is preferably tested using dye penetrant or magnetic particle inspection to ensure the quality of the restored surface is free of defects. As a final check, an unworn connector pin or equivalent gauge must be easily inserted through both bores at the same time.

Figures 4, 5:
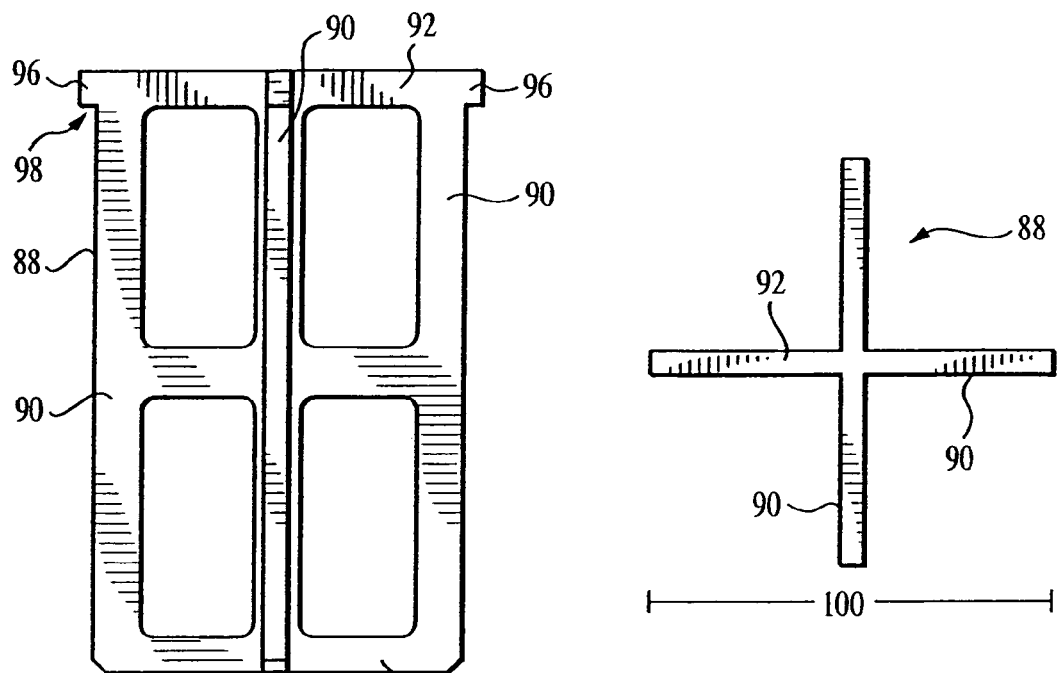
FIG. 4 is a side view of a drop-in bore gauge.
FIG. 5 is a top view of a drop-in bore gauge.
Figure 6:
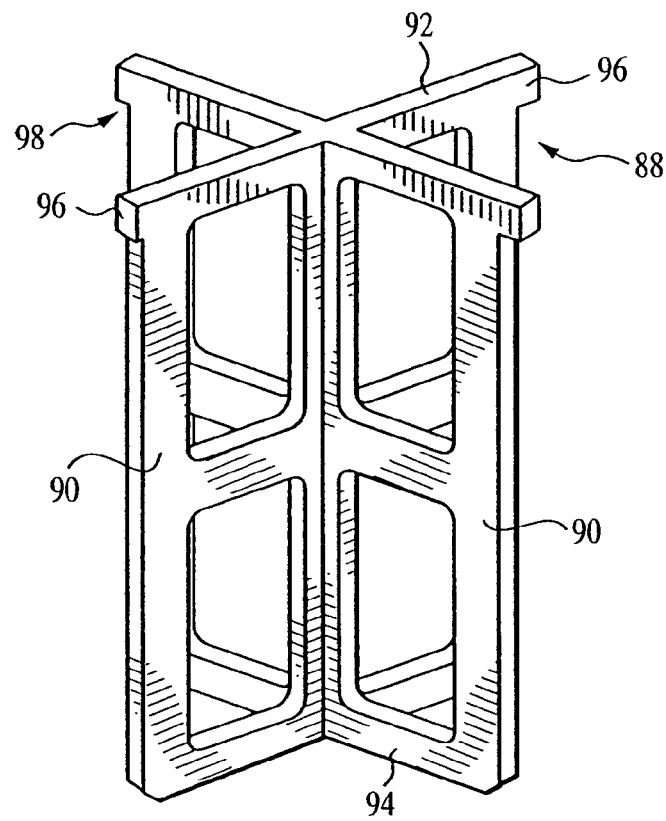
FIG. 6 is a perspective view of a drop-in bore gauge.

The measurement of the ASF female connector is preferably accomplished using the drop-in gauge 88, shown in FIGS. 4–6 and 12–13. As shown in FIG. 5, the drop-in gauge 88 preferably includes four radially extending measurement fin sections, each positioned at 90 degrees from the adjacent fin. The fins 90 are preferably of sufficient length to extend through the bores 24 and 26 in the female casting 12 of the connector, and each fin preferably defines a measurement edge. The drop-in gauge 88 has a top end 92 and a bottom end 94. The top end 92 of the drop-in gauge 88 can be used as a handle portion. The top end 92 also includes tabs or flanges 96 on each fin 90 of the gauge 88 to create shoulders 98 at the top end 92 of the gauge 88 as shown in FIGS. 4 and 6. The width of the flange 96 is greater than the width of the rest of the fins 90 and greater than the width of the bores 24 and 26 in the female casting 12. Thus, the drop-in gauge 88 can be seated in the bore without falling through, as shown in FIGS. 12–13. The width of the arms 90, not including the extensions of the tabs 96, is such that total width or diameter 100 of the gauge is approximately less than 1/8" less than the diameter of an unworn bore. Different diameter gauges can be used based on different connectors and their required dimensions.

The drop-in gauge 88 can be used on both the upper bore 24 and lower bore 26 of the female casting 12. The gauge 88 is inserted into both bores 24 and 26 and is positioned squarely against the posterior surface 102 of the bores, which functions as a reference point as it receives negligible wear. If a 1/8" diameter pin can be inserted between the fins 90 of the gauge 88 and any point of the anterior surface 86 of the bore, restoration of the bore is required. If a 1/8" diameter pin cannot be inserted between the arms 90 of the gauge 88 and any point of the anterior surface 86 of the bore, restoration of the bore is not required.

Once the welding and machining steps on the female bores 24 and 26 have been completed, the drop-in gauge 88 is placed in the reconditioned bore, again positioned squarely against the posterior surface 102 of the bores 24 and 26 using the flanges 96 as guides. The gauge 88 must easily rotate at least 180 degrees within the bores to assure that the proper dimensions are met.

Reconditioning of National Castings Articulated Connectors

Reconditioning of the National Casting connectors is done using similar methods. Typical wear areas of the National Castings connectors include the anterior surface 286 of female bore 226 located in the bottom portion 220 of the female casting 212 and the contact surface 230 of the male casting 210, as shown in FIG. 2. The female casting 212 of the connector is reconditioned in the same manner as the ASF female casting, except that the National Castings female casting 212 usually has only one bore 226 subject to wear rather than both and may require a different dimension gauge.

Figure 19:
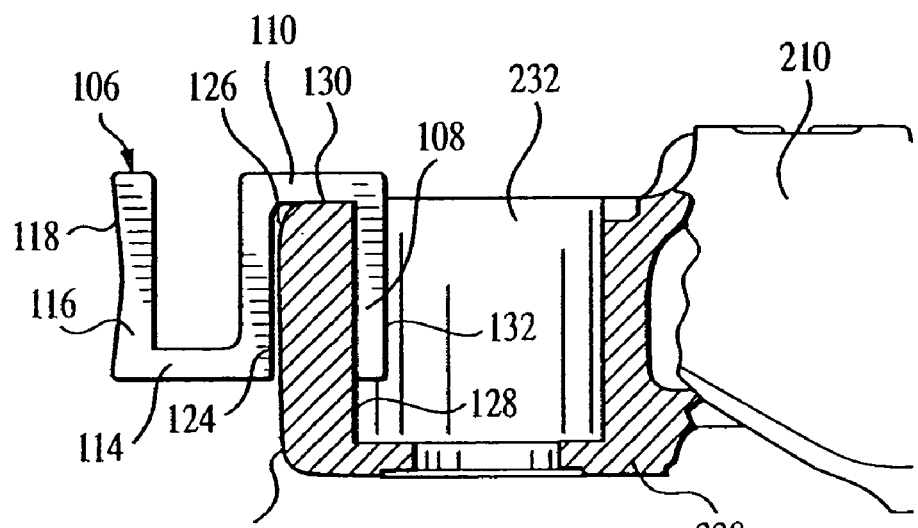
FIG. 19 is a cross sectional view of an S-shaped gauge applied to a National Castings male casting.

Determining if the male casting 210 of the National Castings connector requires reconditioning is ascertained using a different gauge, better suited for its shape. Specifically, determination of required reconditioning is preferably accomplished using an S-shaped gauge 106. The S-shaped gauge is preferably formed from hardened plate steel and has five segments roughly forming an S-shape as shown in FIGS. 10, 11 and 19. The first four segments, 108, 110, 112, and 114 are located relatively perpendicular to one another. The following dimensions are for a standard National Castings connector, but they could be changed to accommodate another type of connector having different dimensions. The segments are preferably approximately 1" wide. The joint between the first segment 108 and second segment 110 is a sharp corner at 90 degrees. The joint between the second segment 110 and third segment 112 is preferably curved and has a 0.5" radius as does the joint between the third segment 112 and the fourth segment 114. The joint between the fourth segment 114 and fifth segment 116 is a sharp corner at 90 degrees. Preferably, the overall length of segments 108, 112 and 116 is 7" while the width of the gauge is 9.07" at its widest.

The outer edge of the fifth segment 116 is different from the other segments. While most of the segments are generally rectangular in shape, the outer edge 118 of the fifth segment 116 is designed to appropriately measure the contour of the male connectors. At each end of the fifth segment 116, the corners 120 of the outer edges 118 are constructed at an acute angle, preferably 6 degrees, from the expected angle, namely that of the 90 degree inner edge of the fifth segment 116. The corners 120 are constructed with a 0.2" radius. Both corners 120 contain the acute angle along the outer edge 118. The two angled corners 120 of the outer edge 118 meet at a midpoint 122 of the segment, approximately 3.5" from each end. The two portions create an obtuse angle, preferably 168 degrees, along the outer edge 118 of the fifth segment 116 with the apex at the midpoint 122 of the segment 116 as can be seen in FIGS. 10 and 11. The inside dimension between the first segment 108 and the third segment 112 is preferably 2.805" while the inside dimension between the third segment 112 and the fifth segment 116 is preferably 2.930". Taking measurements will hence differ based on whether the A side, the first segment 108 of the gauge 106, or the B side, the fifth segment 116 of the gauge 106 is used. Different circumstances will call for the use of either side of the gauge as will be explained below.

Figure 18:
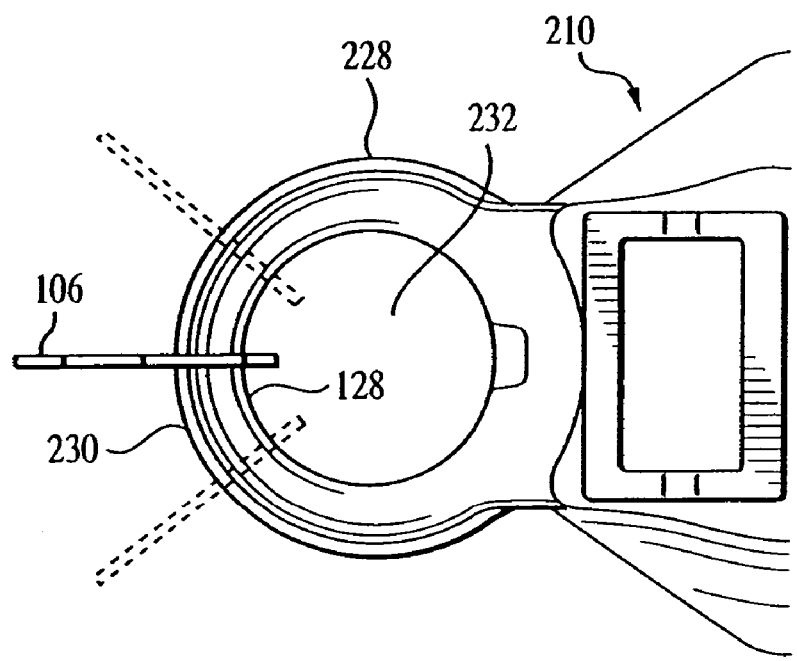
FIG. 18 is a top view of an S-shaped gauge applied to a National Castings male casting.

Determining whether the male casting 210 of the connector requires reconditioning involves two measurements taken with the S-shaped gauge 106, once the bushing is removed. The first is measuring the gap 126 between the contact surface 230 of the male casting 210 and the back edge 124 of the third segment 112. The measurement is taken by placing the first segment 108 of the S-shaped gauge 106 flush against the anterior surface 128 of the male bore 232. The anterior surface 128 of the male bore 232 acts as a reference point as negligible wear occurs there. The second segment 110 must also be flush against the top 130 of the male casting 210 adjacent to the bore 232 as seen in FIG. 19. The S-shaped gauge 106 is kept perpendicular to the bore 232 as it is swept through a preferably 80° angle as shown in FIG. 18. The second measurement is taken by placing the outer edge 132 of the first segment 108 against the far inside edge of the sidewall 222 of the female casting 212 of the connector.

Using these two measurements, the following will determine if the male casting 210 requires reconditioning. If a ⅛" diameter pin can be inserted in the narrowest gap 126 between the contact surface 230 of the male casting 210 and the back edge 124 of the third segment 112 of the S-shaped gauge 106, but a ⅛" diameter pin cannot be inserted in the largest gap between the far inside end of the sidewall 222 of the female casting 212 and the first segment 108 of the S-shaped gauge, restoration of the contact surface 230 is required using side A of the S-shaped gauge. Alternatively, if a ⅛" diameter pin can be inserted in the narrowest gap 126 between the contact surface 230 of the male casting 210 and the back edge 124 of the third segment 112 of the S-shaped gauge 106, and a ⅛" diameter pin can be inserted in the largest gap between the far inside end of the sidewall 222 and the first segment 108 of the S-shaped gauge 106, restoration of the contact surface 230 of the male casting 210 is required using side B of the S-shaped gauge. If a ⅛" diameter pin cannot be inserted in the narrowest gap 126 between the contact surface 230 of the male casting 210 and the back edge 124 of the third segment 112 of the S-shaped gauge, but a ⅛" diameter pin can be inserted in the largest gap between the far inside end of the female sidewall 222 and the first segment 108 of the S-shaped gauge, restoration of the contact surface 230 is required using side B of the S-shaped gauge 106. Lastly, if a ⅛" diameter pin cannot be inserted in the narrowest gap 126 between the contact surface 230 of the male casting 210 and the back edge 124 of the third segment 112 of the S-shaped gauge 106, and a ⅛" diameter pin cannot be inserted in the largest gap between the far inside end of the female sidewall 222 and the first segment 108 of the S-shaped gauge, restoration of the contact surface 230 is not required.

If it is determined that the contact surface 230 of the male casting 210 requires reconditioning, the process is similar to that for the ASF connector. The area in and around that requiring reconditioning is preheated to 300–500° F. A non-contact thermometer should be used to confirm proper temperature. The affected area is then slightly overbuilt with weld, preferably using the same weld wires and the same machine settings as with the male ASF connector. The built-up area is then machined back to conform to the appropriate side of the gauge 106 and existing adjacent surfaces. The same protocols as to welding, machining, and cooling of the reconditioned connector apply. The male casting is likewise remeasured to assure that the proper dimensions have been achieved. It should again be noted that the bore 232 in the male casting 210 of the connector should be checked to ensure that no weld splatter or protrusions are present which would hinder the subsequent installation of the bushing.

Semi-Automatic Process for Reconditioning Connectors

A semi-automatic technique will now be described as implemented for the reconditioning of an ASF female articulated connector casting. It is contemplated that the presently preferred technique, with appropriately modified fixtures and gauges, will be applicable to other connector castings, female National Castings articulated connector castings, and the male casting counterparts thereof.

As described above and shown in FIGS. 1 and 3 in the present disclosure, the ASF female casting 12 defines two bores 24 and 26 aligned on a vertical axis and extending through a top 18 and bottom 20 portion of the female casting. The bores are sized to receive a pin 16 that extends through the bores 24 and 26 and through a bore 32 in the male casting 10 when the male casting is positioned between the top 18 and the bottom 20 portions of the female casting. As noted above, the top and bottom bores of the female casting are prone to misshaping and disqualification due to the wear caused by forces on the inner surfaces of the bore from the pin during use.

As noted in the description of the above method, reconditioning of the bores on the female casting is typically accomplished through the manual application of weld to the inner surfaces of each bore. The weld application is subsequently machined by hand to achieve a standard sizing and tolerance in the bores. The machining procedure can be a tedious, manual process, and may take as much as 20 hours to complete by hand due to the superior strength of the materials used in the casting and the weld. It is therefore desirable to automate the machining process, particularly where more than one bore is involved in a single casting, as in the case of the female ASF connector casting.

In accordance with the present invention, a fixture assembly is provided to assist in the automatic or semi-automatic reconditioning of an ASF female casting. Preferably, the fixture includes an adjustable, rigid frame apparatus as shown in FIGS. 21 and 22A–22E. Turning first to FIG. 22A, the fixture 700 includes a horizontally positioned fixture weldment top plate 702 and a corresponding horizontal bottom plate 704. The top plate 702 and the bottom plate 704 are connected via a pair of spaced, vertical sideplates 706 rigidly attached to and extending between the top plate 702 and the bottom plate 704. A pair of legs 707 is rigidly attached in line with the sideplates 706 to the underside of weldment bottom plate 704 for supporting the fixture weldment 704. Gussets 703 are mounted in various corners of the frame of the fixture 700 to reinforce the rigidity of the structure. In the rigid frame of the fixture 700, the horizontal plate 702 and 704 and the vertical sideplates 706 define an interior space 708.

The fixture 700 incorporates a clamping means to allow attachment of the fixture 700 to a female ASF casting. Preferably, the clamping means includes at least a pair of contoured vertical plate weldments 710 that extend inwardly from the sideplates 706. The inner walls of the weldments 710 define contoured receiving guideways 712 extending below a protruding triangular flange 714 of the upper portion of each weldment 710. The guideways 712 and a major portion of each vertical weldment 710 are covered on one side with a tapped clamping plate 716 of generally rectangular shape mounted flush to the face of each weldment 710. A second tapped clamping plate 718 sandwiches the narrow portion of each of the vertical plate weldments 710 and extends generally parallel to the tapped plate 716. Preferably, each tapped plate 718 is held in place with the opposing tapped plate 716 via a set of alloy steel socket head screws 726 that extend through openings in the vertical weldment 710. Preferably, high-strength alloy steel washers and hexagonal nuts are used in conjunction with the screws 726 to complete the clamping and the fastening structure. The interior surface of each guideway 712 and the inner surfaces of each tapped plate 716 and 718 cooperate to define a slot opening 728 for holding the fixture 700 to the peripheral flange of an ASF female casting.

Figure 21:
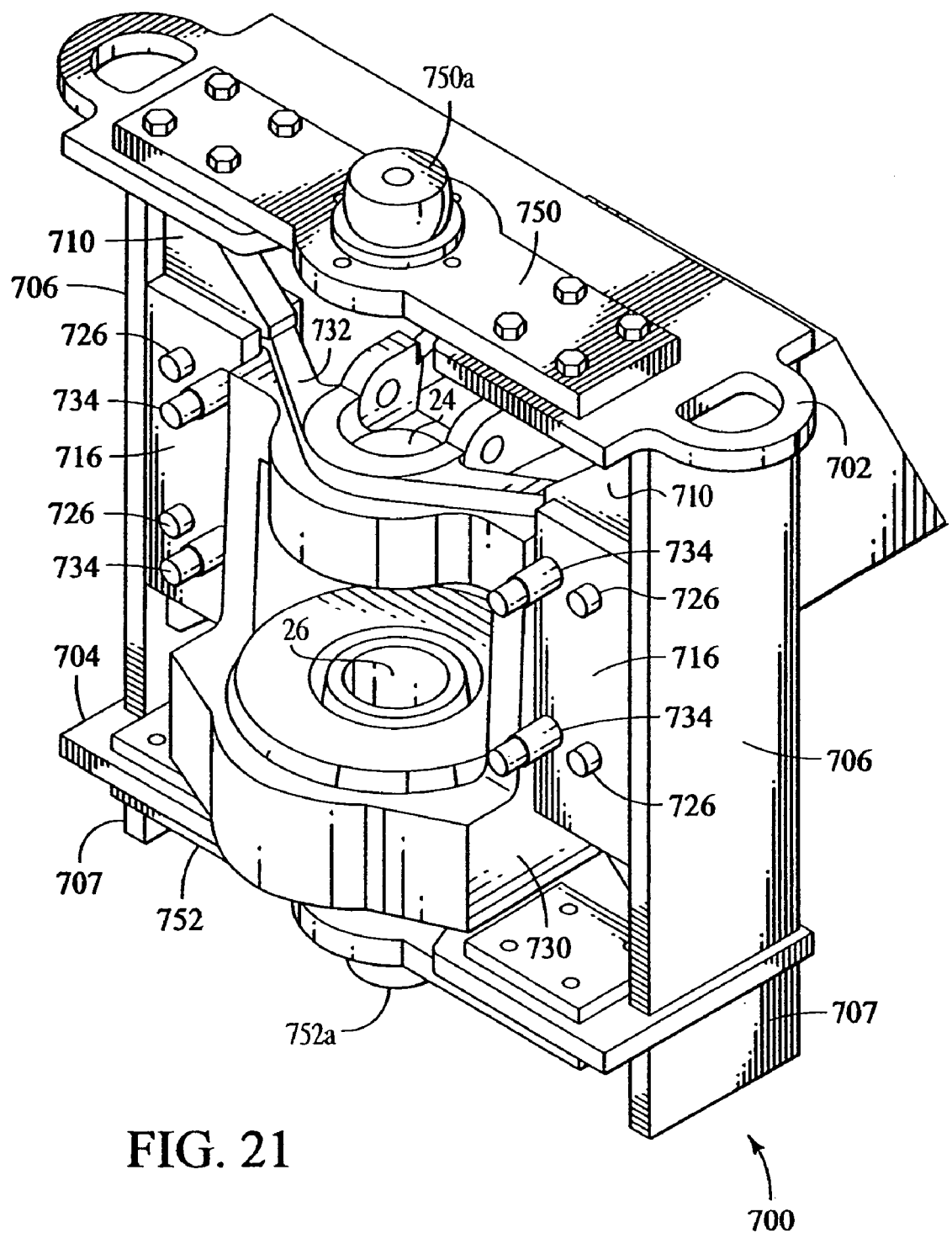
FIG. 21 is a perspective view of a fixture assembly applied to a female connector casting for use in a semi-automated embodiment of the present invention.
Figure 22B:
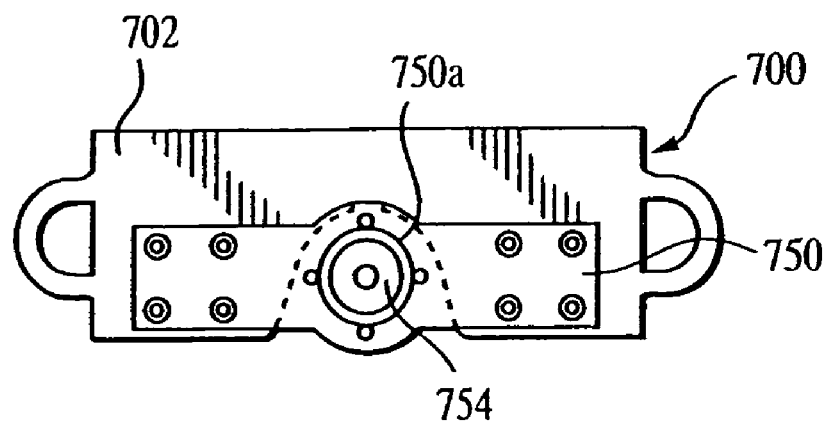
FIG. 22b is a top view of the fixture of FIG. 22a for use in a semi-automated embodiment of the present invention.
Figure 22A:
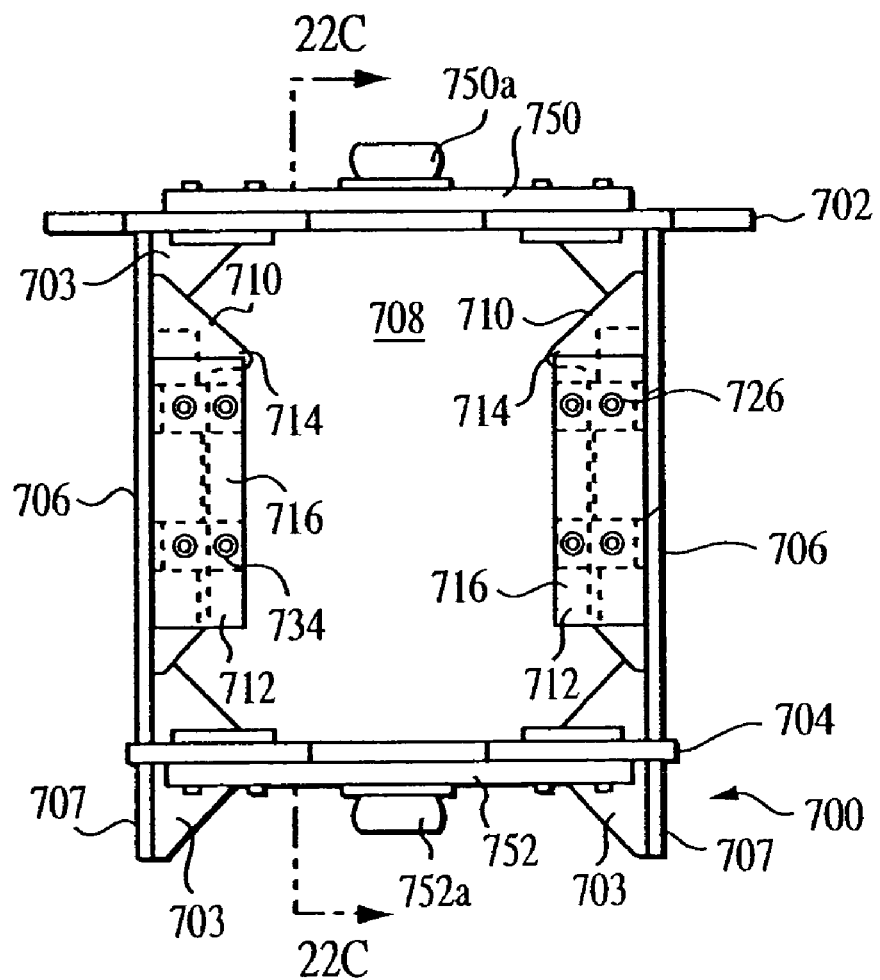
FIG. 22a is a front view of the fixture for use in a semi-automated embodiment of the present invention.
Figure 22D:
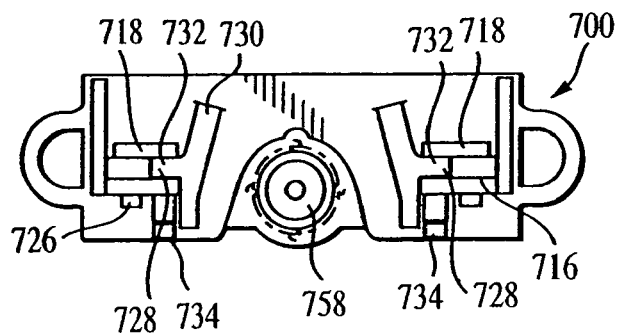
FIG. 22d is a top cross-section view of the fixture applied to ASF female connector casting as shown in of FIG. 22e.
Figure 22E:
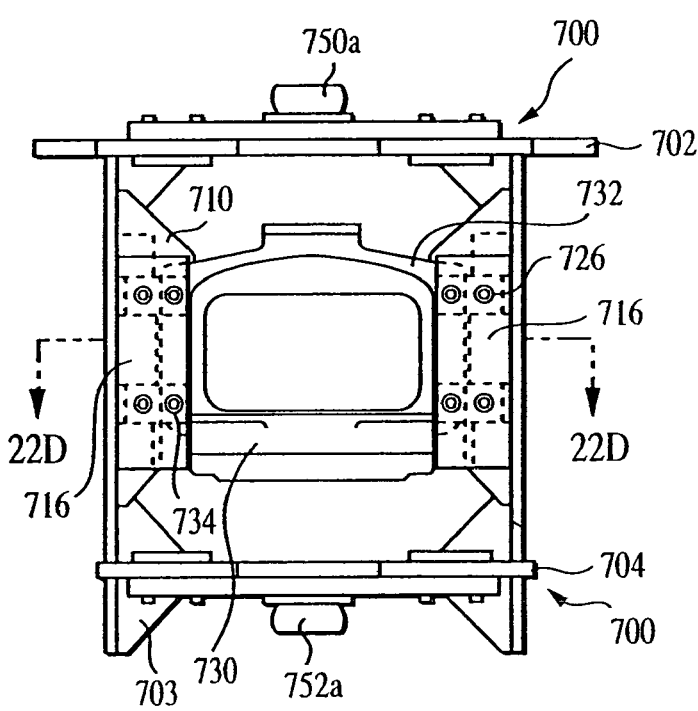
FIG. 22e is a front view of the fixture of FIG. 22a applied to ASF female connector casting.
Figure 22C:
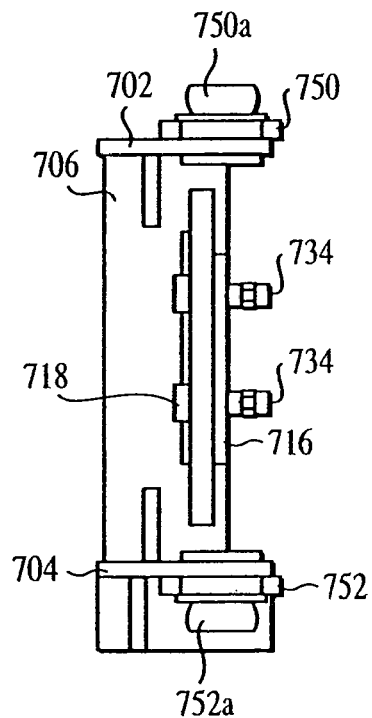
FIG. 22c is a side cross-section view of the fixture of FIG. 22a for use in a semi-automated embodiment of the present invention.

FIGS. 21 and 22D–22E show the fixture 700 attached to an ASF female casting 730. In particular, FIGS. 22D–22E show that the slot opening 728 is sized to capture the vertical portion of the annular flange 732 defined on the outside of the female casting 730. By tightening the bolts or screws 726, the plates 716 and 718 may be drawn toward each other to act as a clamp to capture the flange 732. As shown in FIG. 22D, threaded tightening bolts may be mounted to the front face of the vertical plate 716 to extend through a threaded opening defined through the plate 716 and into the slot opening 728. In this fashion, the bolts 734 may be tightened against the flange 732 so that the flange 732 is urged against the plate 718 to more tightly secure the fixture 700 to the female casting 730. Although it should be noted that other fastening structures may be provided, such as other types of clamping configurations and clamp jaws, the present embodiment has been shown to be a simple and adequate exemplary approach.

To facilitate the attachment and alignment of a bore welder and an automatic boring apparatus, the top and bottom plates 702 and 704 may be adapted to receive a bearing mounting structure. In particular, in the preferred embodiment, each of the plates 702 and 704 may receive a mount or spherical bearing mount 750 and 752, respectively, such as the Model No. 26517 two-arm mount manufactured by Climax Portable Machine Tools, Inc. of Newberg, Oreg. As shown in FIGS. 22A and 22B, the mount 750 may be secured using eight bolts and two nut plate assemblies extending through openings in the top plate 702. The lower mount 752 may be secured to the bottom plate 704 in the same fashion. Each mount 750 and 752 may be adjusted in its position relative to the top and bottom plate 702 and 704. As shown in FIGS. 22A and 22B, each mount includes a bearing receiving portion 750a and 752a, respectively. When the fixture 700 and each mount 750 and 752 is properly aligned on the female casting 730, the bores in the female casting 730 will be axially aligned with the bore of each bearing receiving portion 750a and 752a to allow a boring bar to be inserted through the bearing receiving portion 750a, through the bores of the articulated connector 730, and subsequently through the bearing receiving portion 752a on the bottom of the fixture 700. The bearing receiving portions 750a and 752a are each configured to receive a spherical bearing 754. An exemplary bearing includes the Model 26248 manufactured by Climax Portable Machine Tools, Inc.

Figure 23:
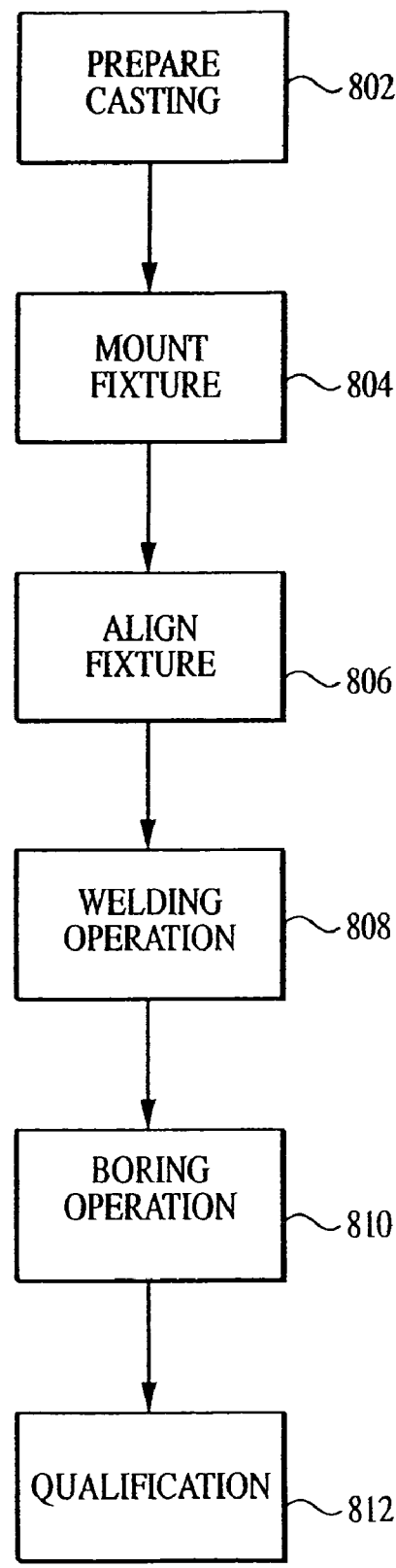
FIG. 23 is a flow chart of the semi-automated process.

An exemplary embodiment of the semi-automatic reconditioning technique for the ASF female articulated connector casting will now be described. FIG. 23 illustrates a flow diagram of one embodiment of the preferred method. The flow diagram will be described below in conjunction with the drawings of FIG. 22A–22E. As shown in the first step 802, the female casting of the ASF articulated connector 730 is prepared for reconditioning. This preparation is similar to that of the previously described embodiments above. In general, however, dirt, grease, lubrication residue, and other contamination must be removed from the bore of the casting prior to the restoration procedure. Preferably, this is performed through burn off and/or machining. Burrs are then removed from the top edges on the bores using a hand grinder.

Figure 27:
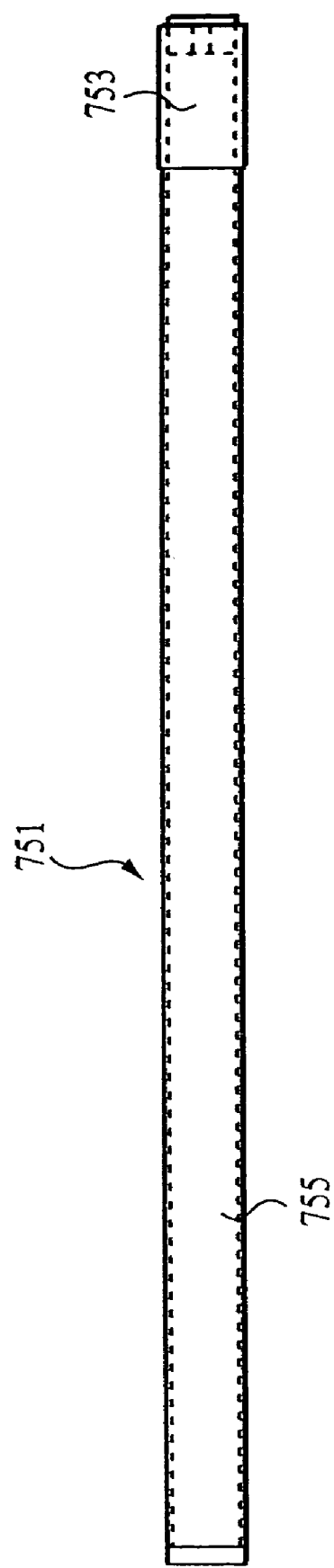
FIG. 27 is a plan view of an alignment tube for use with the semi-automated process.

Next, as shown in step 804, the fixture 700 is mounted to the female ASF casting 730. As noted above, the clamp plates 718 are loosened from the side weldments 710 and the fixture is placed upon the peripheral flange 732 of the female casting 730. Ideally, the fixture 700 is set flush and centered against the top and front outer casting flanges 732. The clamping plate 718 is rotated into position and tightened to the fixture 700 around the flange 732, and the securement bolts 734 may be further tightened to secure the fixture 700 tightly to the flange 732. The clamping bolts are then tightened. The upper bearing mount 750 and the lower bearing mount 752 are then slightly loosened from the top and bottom plates by loosening their corresponding mounting bolts. A 2.25 in. diameter alignment tube 751 having handle portion 753 and aligning portion 755, as shown in FIG. 27, is then inserted through the bore of the bearing 754 and bearing receiving portion 750a, through the bores of the casting 730, and through the lower bearing 758 and bearing receiving portion 752a. The uniform alignment tube 751 is used to ensure that the bearings are properly aligned with the bores of the casting.

To ensure alignment of the tube within the bore of the casting 730, a pair of centering gauges 902 are used to position the alignment tube 751 relative to the casting. The centering gauges are shown in FIGS. 24A and 24B. In the preferred embodiment, the centering gauge 902 is a 45-degree annular cylindrical arc section having a 3.97-in. diameter outer vertical wall 904 and a 2.26-in. diameter inner wall 906. Preferably, the material used to form the gauge is a hardenable steel.

As noted above, two of the centering gauges 902 are utilized to align the fixture 700. To align the fixture 700, the centering gauges 902 are positioned between the alignment tube 751 and the unworn posterior bore surfaces of female ASF casting 730. Each bearing mount 750 and 752 is then adjusted so that the alignment tube fits snugly against the inner wall 906 of the centering gauge and the outer wall 904 of the centering gauge contacts the inner wall of the unworn posterior bore surfaces of female casting 730. Once in this orientation, the bolts holding the bearing mounts 750 and 752 are tightened to the fixture 700. The alignment tube 751 and centering gauges 902 may then be removed carefully.

The welding operation may then proceed in accordance with step 808 in FIG. 23 to add weld metal to portions of the casting bores. In the preferred embodiment, a bore welding device is utilized to rebuild and refurbish the worn bores of the casting. An exemplary bore welding device includes the Bortech Model 306-P Bore Welder supplied by Climax Portable Machine Tools, Inc. of Newberg, Oreg. Preferably, the bore welding device is adapted to interface the bearing mounting structures of the fixture so that the device will operate in alignment with the bore of the casting. Of course, a number of other bore welding devices may be utilized without departing from the scope of the present invention. As with many conventional automatic welders, the device preferably may be programmed via a computer to specify the bore extension and the amount of weld to be applied to the bore, among other parameters. Furthermore, the number of passes may also be programmed into the operation in addition to a variety of other detailed steps. Preferably, the bore welding device is configured so that weld metal is applied in successive, concentric arcs to the inside of the bore for 160 degrees of nozzle sweep at the anterior side of the bore. This is where most of the reconditioning within the female ASF casting bore is required. Subsequent weld passes around the full diameter will also likely be necessary to assure bore cleanup during machining.

The chemical composition and alloy of the weld wire is as specified above in connection with the previous embodiment. In the preferred embodiment herein, the bore welder settings are as follows: stepsize=2.8–2.9; wire speed=2.6–2.7; rotational speed=6.9–7.0; arc volts=6.5–6.6. The welder power unit settings and required gas are as follows: gas=$CO_2$ or 75% Ar/25% $CO_2$; volts=23–24; and amps=140–160. These parameters are exemplary only. It is important that following the centering and securement of the bore welder, the bore is preheated to 200° F. before welding. Following welding, the restored area is slow cooled to below 150° F. using an insulating blanket or equivalent. This process is repeated for both the upper and the lower bores of the casting. The welding apparatus is then carefully removed from the casting fixture 700 after the step 808 is completed.

Next, the boring operation is set up and initiated as shown in step 810 of FIG. 23. As noted above, the boring operation removes excess weld and machines the interior of the bore to a specified dimension. In this semi-automatic method of the present invention, a specially designed boring bar is used in conjunction with an automated boring bar driving assembly mounted to the fixture 700. In the preferred embodiment, the driving assembly is a Model No. BB 1149 portable boring bar manufactured by Climax Portable Machine Tools, Inc. of Newberg, Oreg. Of course, a number of other boring bars or motorized assemblies may be utilized without departing from the scope of the present invention.

In the preferred embodiment, a 60-in. modified boring bar is used to refine the bore in the ASF female casting. This boring bar 950 is shown in FIG. 25. As shown, the boring bar 950 is a modified standard bar provided by Climax Portable Machine Tools, Inc., and includes at least two tool holder slots 952 and 954 extending radially from the axial center of the boring bar. The tool holder slots 952 and 954 are each sized to receive a cutting tool 960 as shown in FIG. 26. Each cutting tool 960 includes a pair of cutting ends 962 and 964 and each tool is reversible. The slots 952 and 954 orient each tool 960 so that its cutting edge protrudes radially from the boring bar 950 in opposite directions, or 180 degrees, from each other.

In accordance with the method of the present invention, the boring bar assembly, which preferably consists of axial feed assembly, rotational drive assembly, the boring bar 950, a plurality of claim scholars and a clamp ring, is mounted to the bearing mounting using an overhead hoist so that the boring bar extends through the top and bottom bearings 754 and 758 and through the bearing receiving portions 750a and 752a. After mounting, the cutting tools 960 are inserted into the boring bar tool holder slots 952 and 954. Tightening screws may be used to hold the cutting tools 960 properly in place to a specified extension on the boring bar 950 using a tool setting block 850, shown in FIG. 28.

Figure 28:
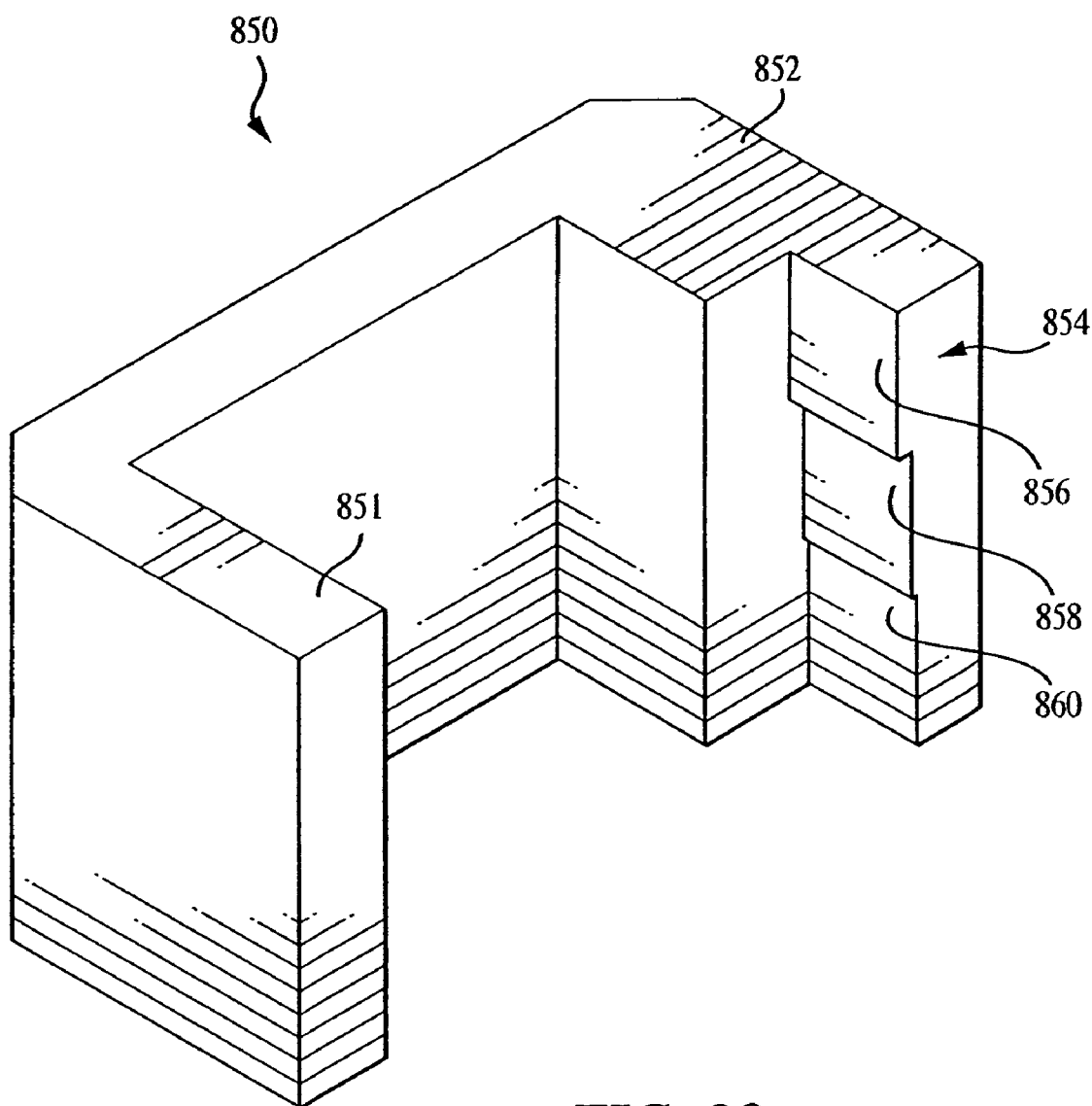
FIG. 28 is a perspective view of a tool setting gauge for use with the semi-automated process.

The tool setting gauge 850, as shown in FIG. 28, is generally C-shaped and is placed around the boring bar 950 adjacent to the tool holder slots 952 and 954. The tool setting gauge 850 provides settings for determining the radial extension of the cutting tools 960 relative to the boring bar 950. The generally C-shaped tool setting gauge 850 includes two ends; a first end 851 which rests against the boring bar and a second end 852 which includes an extension guide 854. The extension guide portion 854 of the tool setting gauge 850 has preferably three graded shoulders 856, 858, and 860 down the height of the extension guide portion 854 of the gauge. The shoulders 856, 858, 860 are stepped increments in the width of the extension guide 854. The extension guide 852 allows the cutting tool to extend to one of the shoulders; the three preferred dimensions, measured as the distance short of the final desired bore dimension on the radius, are 0.080" from final radius at shoulder 856; 0.030" from final radius at shoulder 858; and a "finish" position which is 0.0" from final radius at shoulder 860. When a cutting tool 960 is inserted into the boring bar 950, the tool setting gauge is applied to the area and the length of extension of the cutting tool 960 from the boring bar is positioned using one of the three shoulders. When the cutting tool 960 is in contact with the appropriate shoulder of the tool setting gauge, the screws securing the cutting tool 960 to the boring bar 950 are preferably tightened, resulting in the cutting tools 960 being secured at the proper extension length. The number and exact measurements of the shoulders of the tool setting guide can be changed and adjusted based on the needs of the system.

The boring machine may then be programmed manually or via computer, as is well known in the art, to make one or more passes through the upper and lower bores of the female casting. Finally, in step 812 of FIG. 23, the reconditioned bores of the female casting are qualified preferably using a drop-in gauge which allows for bore size qualification with the boring bar installed.

Figure 29:
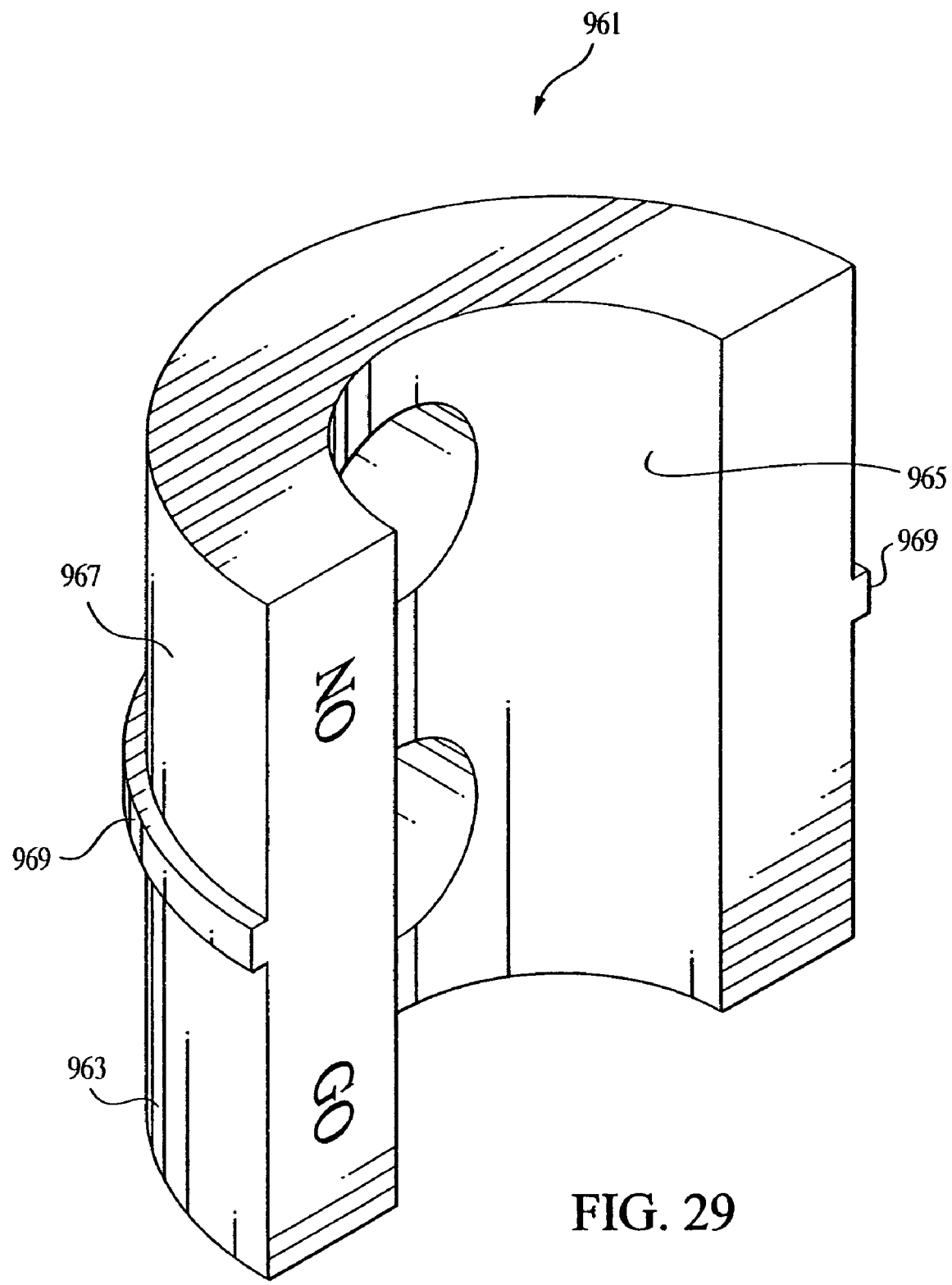
FIG. 29 is a perspective view of a bore gauge for use with the semi-automated process.

As shown in FIG. 29, the drop-in gauge is bore gauge 961, which is preferably a 180-degree annular cylindrical arc section. The bore gauge 961 has two ends, each having different outer dimensions: a "GO" end has a 4.000" diameter outer vertical wall 963; a "NO GO" end has a 4.030" diameter outer vertical wall 967, with each gauge end sharing a common 2.260" diameter inner wall 965. Along the length of the bore gauge 961 and between the two outer walls 963 and 967 are stop tabs 969 running the half circumference of the gauge, which have a greater width than that of the female bore which is being measured, and hence the bore gauge can be positioned in the bore without falling through.

Preferably the material used to form the gauge is hardened steel. The dimensions of the bore gauge can be adjusted based on the connector type, the size of the bore being reconditioned, and the size of the boring bar used.

The inner wall 965 of the bore gauge 961 fits the boring bar 950 while the outer wall 963 of the bore gauge mirrors the female bore of the connector 730 and is capable of determining whether the machined female bore falls within the appropriate size and tolerance. The inner wall 965 is positioned against the boring bar 952 diameter where it is slid over the boring bar to make contact with the female bores. In this position, the "GO" side with outer wall 963 must slide easily and completely into each female bore from the top and bottom of each bore, while the opposite "NO-GO" side with outer wall 967 must not slide into the bores at all. The quality of the restoration is preferably inspected for defects visually and with the use of common non-destructive methods such as aye penetrant or magnetic particle.

Of course, one skilled in the art will realize that the machines, fixtures, tools and gauges used in the above embodiment of the reconditioning method are only exemplary and many alternatives exist. The examples illustrated herein are therefore not meant to be restricting.

The invention claimed is:

1. A method for confirming the dimension of a portion of an articulated connector mounted to the end structure of a railcar, said method comprising the steps of:

providing a gauging device having at least two pivotally connected members;

securing a first member of said gauging device to a reference portion of said connector;
aligning a second member of said gauging device with a non-reference portion of said connector; and
measuring the dimension of said non-reference portion by reviewing the relative position of said second member.

2. The method of claim 1 wherein said second member of said gauging device is pivotally connected to said first member, and said second member is pivotable around at least a portion of said connector to facilitate said step of measuring said dimension.

3. The method of claim 1 wherein said reference portion further comprises a portion of said articulated connector that is not significantly deformed from wear.

* * * * *